(12) United States Patent
Welsch et al.

(10) Patent No.: US 11,525,718 B2
(45) Date of Patent: Dec. 13, 2022

(54) ULTRASONIC FLUID FLOW MEASURING SYSTEM WITH ULTRASONIC TRANSDUCERS PROVIDED IN CHAMBERS FORMED THROUGH THE PIPE WALL INTO THE FLOW PASSAGE

(71) Applicant: Levitronix GmbH, Zürich (CH)

(72) Inventors: Guido Welsch, Mettmenstetten (CH); Maciej Bober, Utting am Ammersee (DE); Jonathan Weber, Uster (CH)

(73) Assignee: LEVITRONIX GMBH, Zürich (CH)

( * ) Notice: Subject to any disclaimer, the term of this patent is extended or adjusted under 35 U.S.C. 154(b) by 56 days.

(21) Appl. No.: 16/933,284

(22) Filed: Jul. 20, 2020

(65) Prior Publication Data
US 2021/0025743 A1    Jan. 28, 2021

(30) Foreign Application Priority Data
Jul. 26, 2019  (EP) .................................... 19188626

(51) Int. Cl.
*G01F 1/66*  (2022.01)
*G01F 1/667*  (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 3,678,731 A | * | 7/1972 | Wells | G01F 1/667 73/861.29 |
| 3,817,098 A | * | 6/1974 | Brown | G01F 1/662 73/861.28 |
| 3,964,309 A | * | 6/1976 | Husse | G01F 1/662 73/861.28 |

(Continued)

FOREIGN PATENT DOCUMENTS

| | | |
|---|---|---|
| CN | 202092696 U | 12/2011 |
| DE | 3312092 A1 | 10/1984 |

(Continued)

OTHER PUBLICATIONS

Extended European Search Report dated Feb. 6, 2020 in corresponding European Patent Application No. 19188626.6, filed Jul. 26, 2019.

*Primary Examiner* — Harshad R Patel
(74) *Attorney, Agent, or Firm* — Global IP Counselors, LLP

(57) ABSTRACT

An ultrasonic measuring device for the measurement of a flow of a fluid, includes a measuring tube, a first chamber and a second chamber. The measuring tube has a central axis, which defines a flow direction for the fluid; The first chamber has a first ultrasonic transducer arranged therein. The second chamber has a second ultrasonic transducer arranged therein. The measuring tube includes an inlet and an outlet for the fluid. The first ultrasonic transducer and the second ultrasonic transducer bound a rectilinear measuring section for the fluid, the first chamber and the second chamber being configured and arranged such that the fluid is capable of flowing around each of them. The first ultrasonic transducer and the second ultrasonic transducer are arranged such that the measuring section extends in the flow direction.

15 Claims, 20 Drawing Sheets

(56) References Cited

U.S. PATENT DOCUMENTS

| | | | |
|---|---|---|---|
| 5,243,863 A | 9/1993 | Gill | |
| 5,463,906 A * | 11/1995 | Spani | A61B 8/06 |
| | | | 73/861.27 |
| 5,597,962 A * | 1/1997 | Hastings | G01F 1/668 |
| | | | 73/861.28 |
| 5,627,323 A | 5/1997 | Stern | |
| 5,905,207 A | 5/1999 | Schalk | |
| 6,575,044 B1 * | 6/2003 | Feller | G01F 1/662 |
| | | | 73/861.27 |
| 7,549,346 B2 | 6/2009 | Yoshida | |
| 7,823,463 B1 * | 11/2010 | Feller | G01F 1/667 |
| | | | 73/861.27 |
| 7,857,506 B2 | 12/2010 | Schick et al. | |
| 7,870,793 B1 * | 1/2011 | Feller | G01F 1/662 |
| | | | 73/861.27 |
| 8,714,030 B1 | 5/2014 | Liu | |
| 9,588,934 B2 | 3/2017 | Murakami | |
| 2015/0082913 A1 * | 3/2015 | Maruyama | G01F 1/66 |
| | | | 73/861.28 |
| 2015/0177036 A1 * | 6/2015 | Speidel | G01F 1/662 |
| | | | 73/861.27 |

FOREIGN PATENT DOCUMENTS

| | | |
|---|---|---|
| DE | 8900110 U1 | 3/1989 |
| DE | 29622602 U1 | 3/1997 |
| DE | 202009011310 U1 | 9/2010 |
| EP | 0152132 A1 | 8/1985 |
| EP | 1760436 A2 | 3/2007 |
| EP | 2759806 A1 | 7/2014 |
| WO | 9207257 A1 | 4/1992 |

* cited by examiner

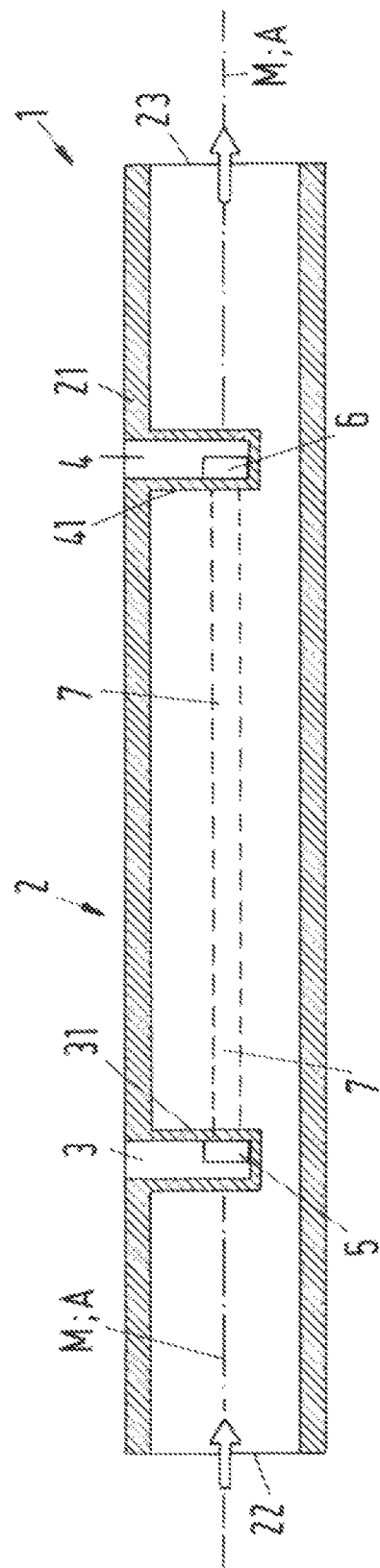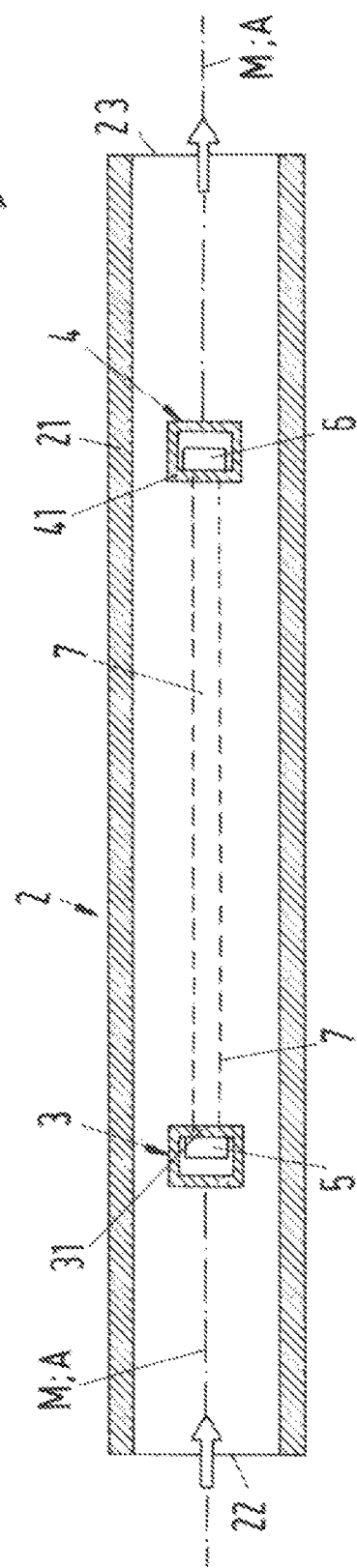

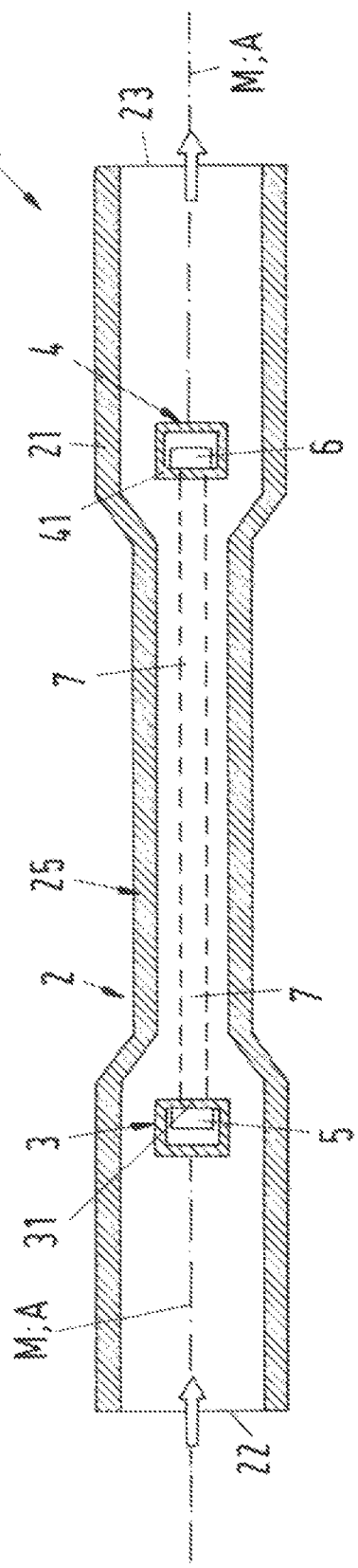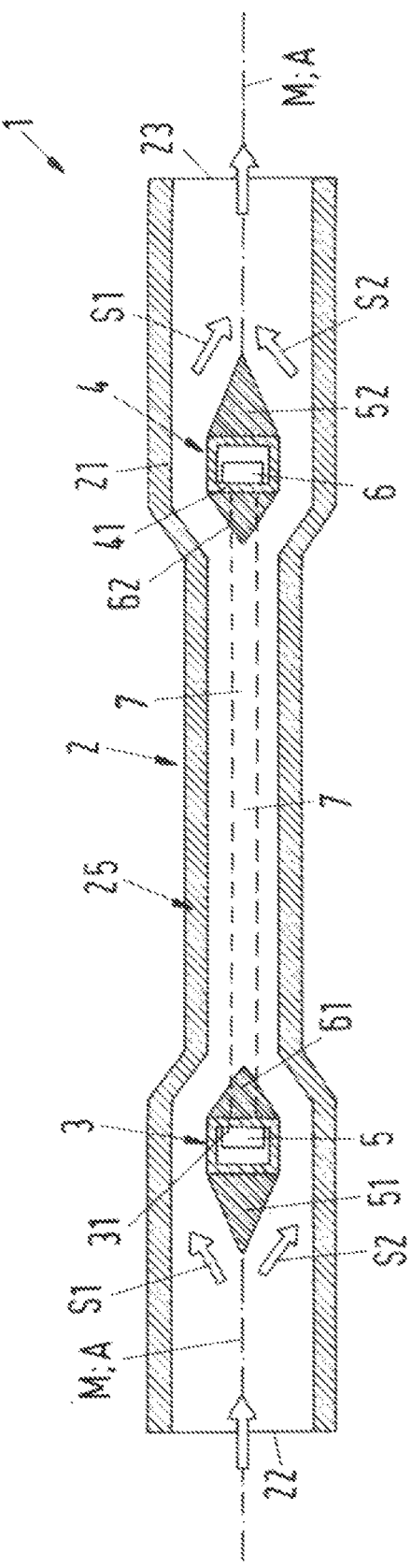

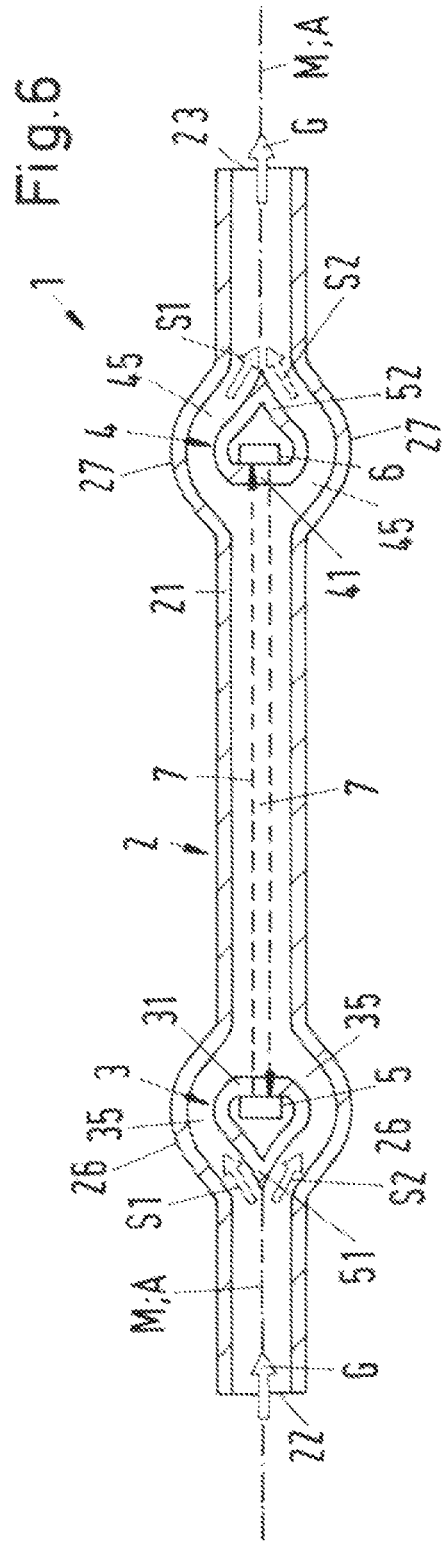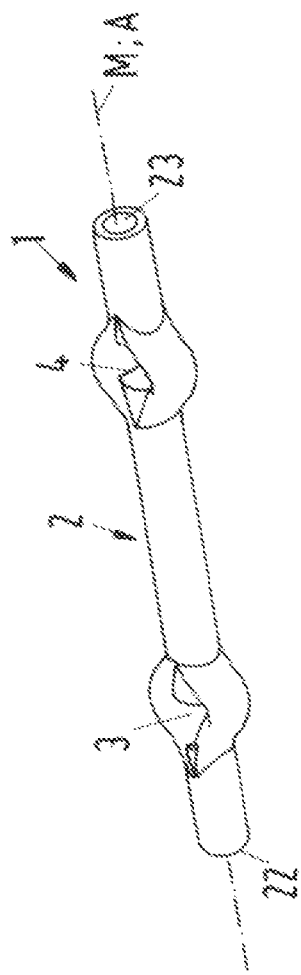

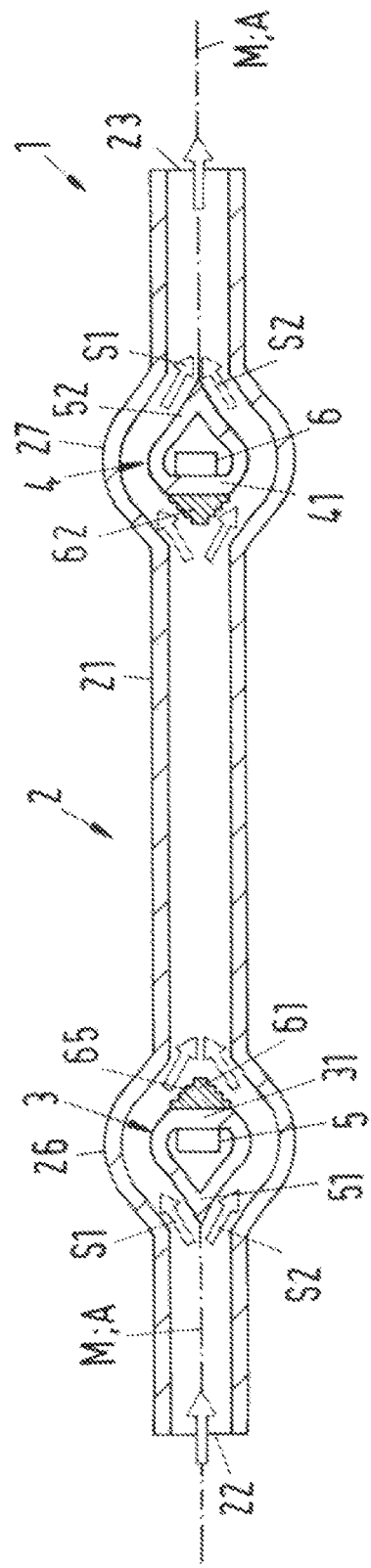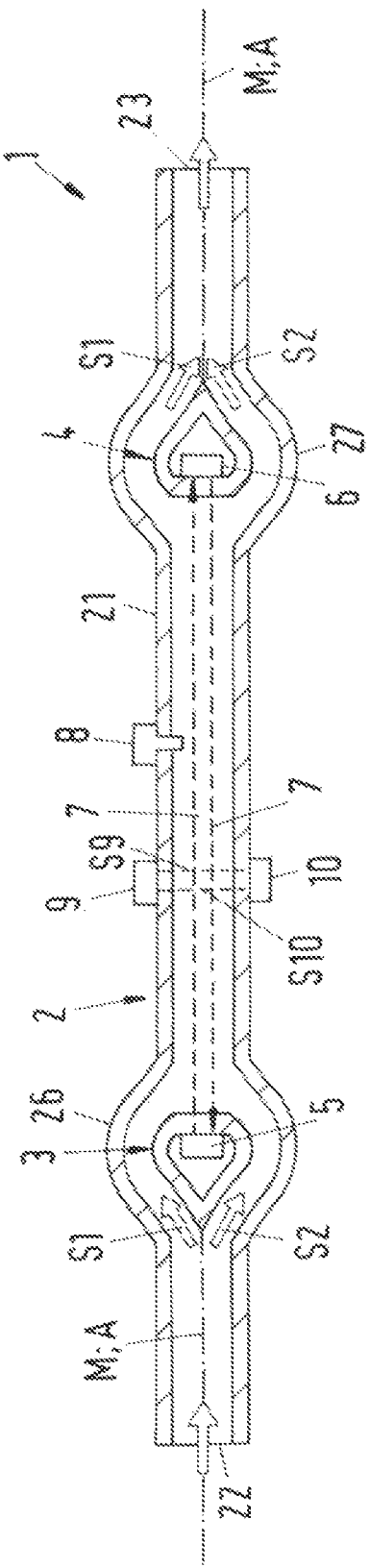

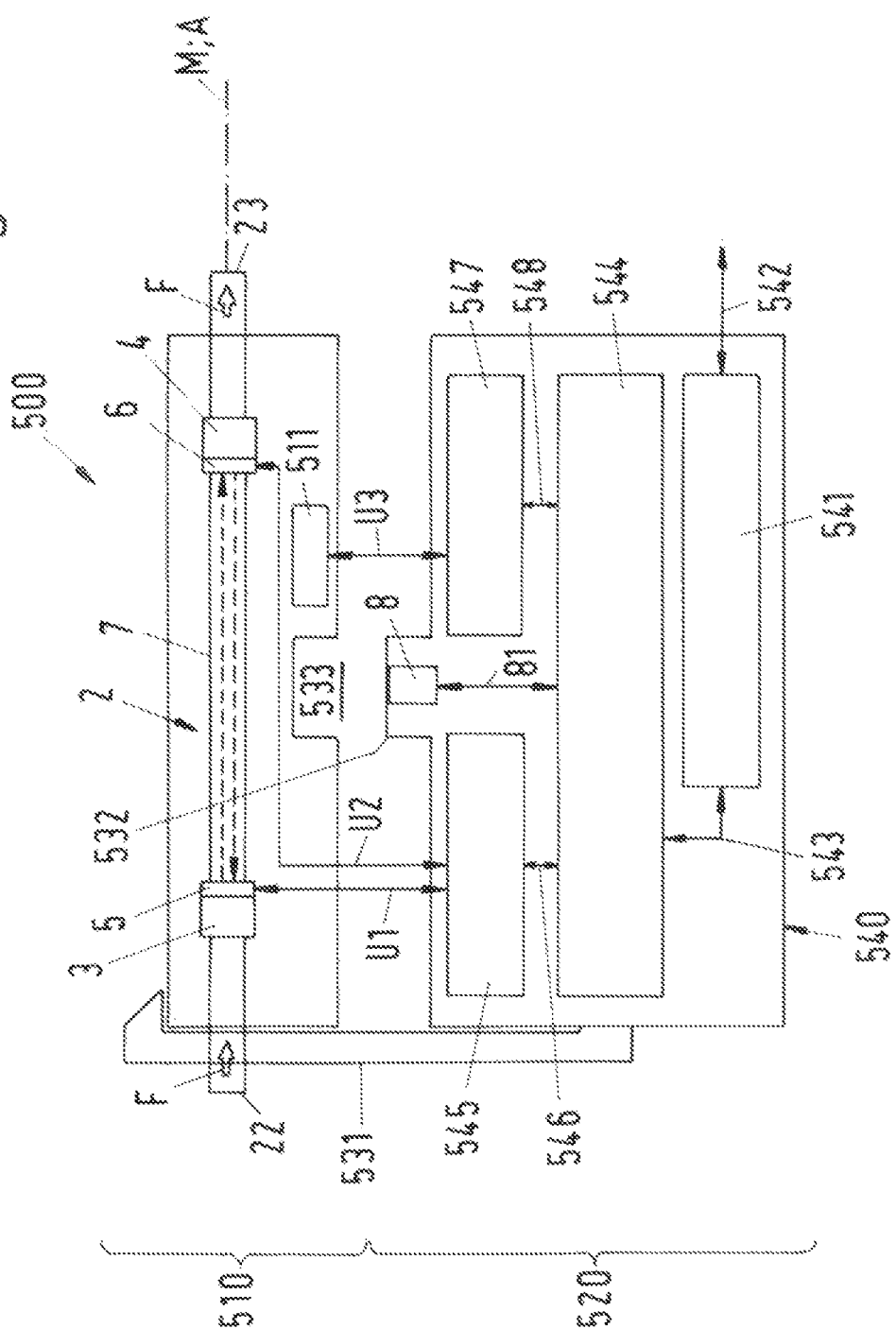

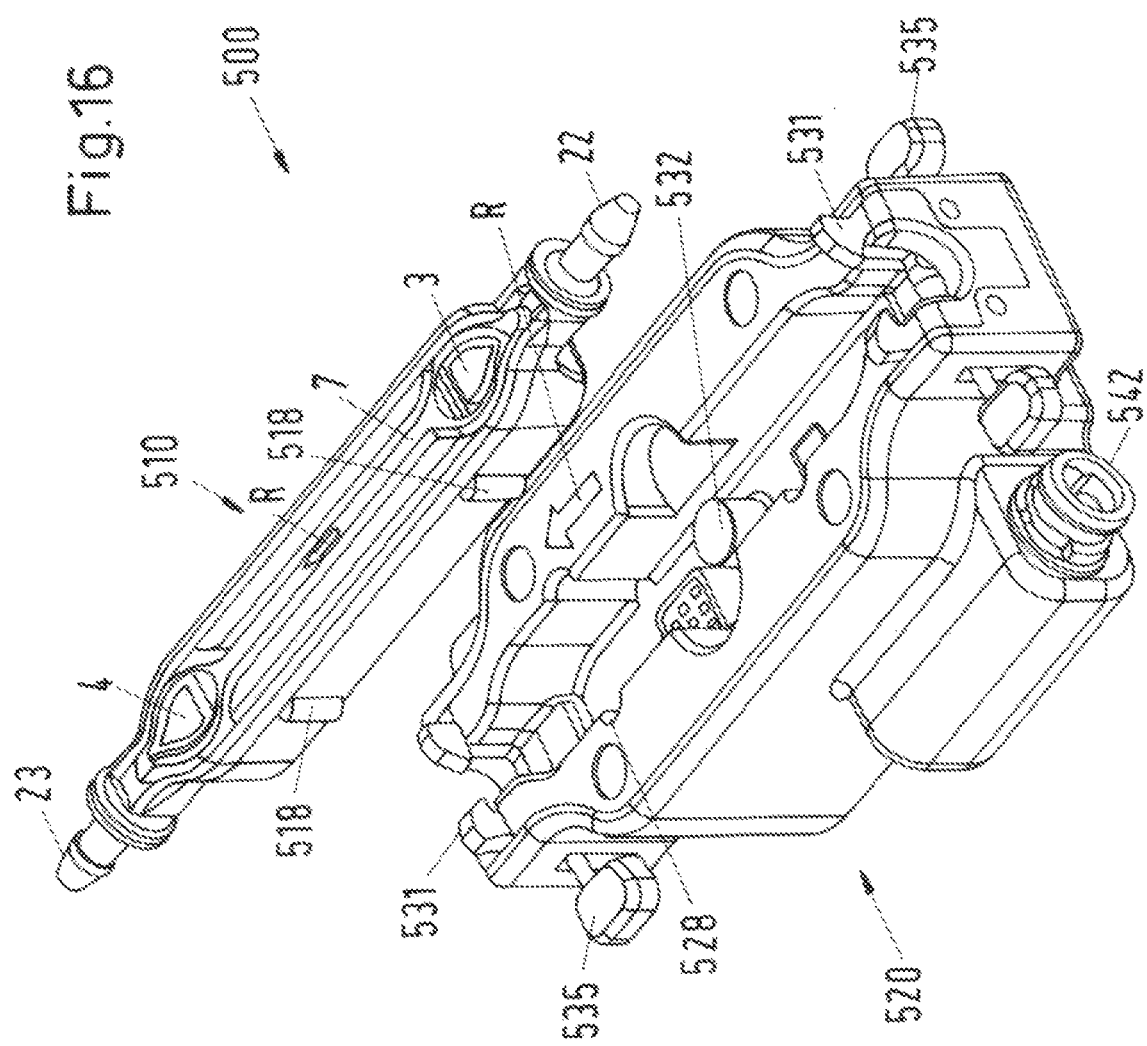

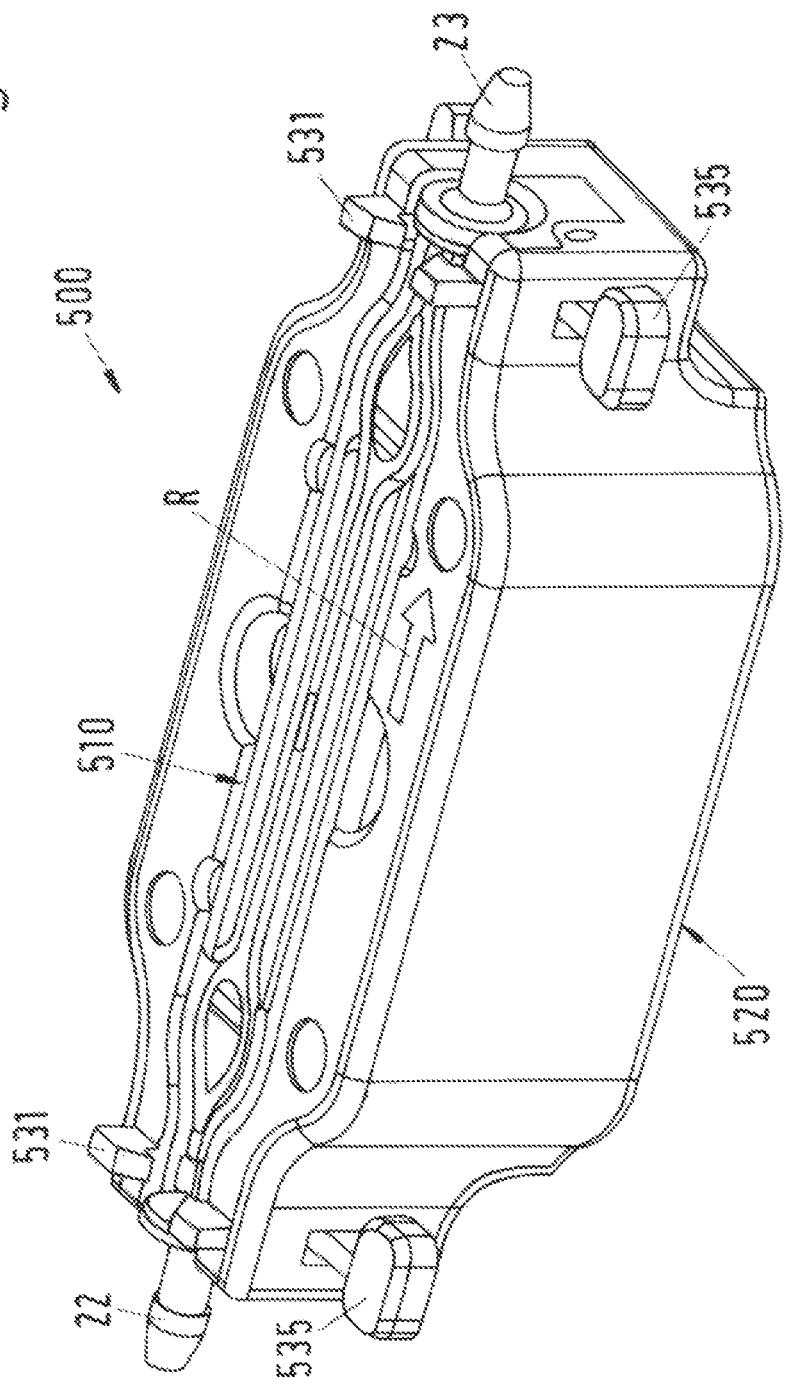

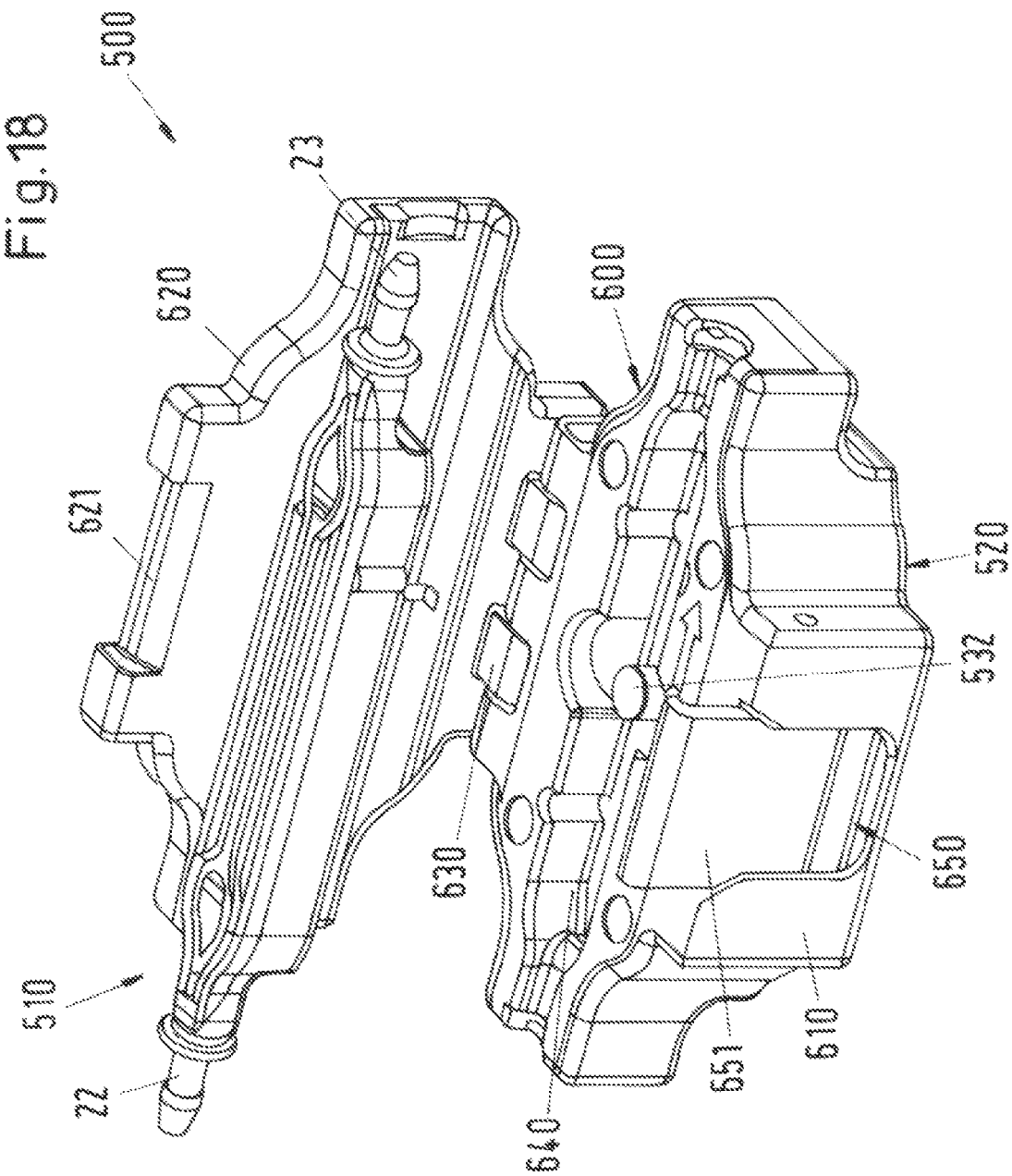

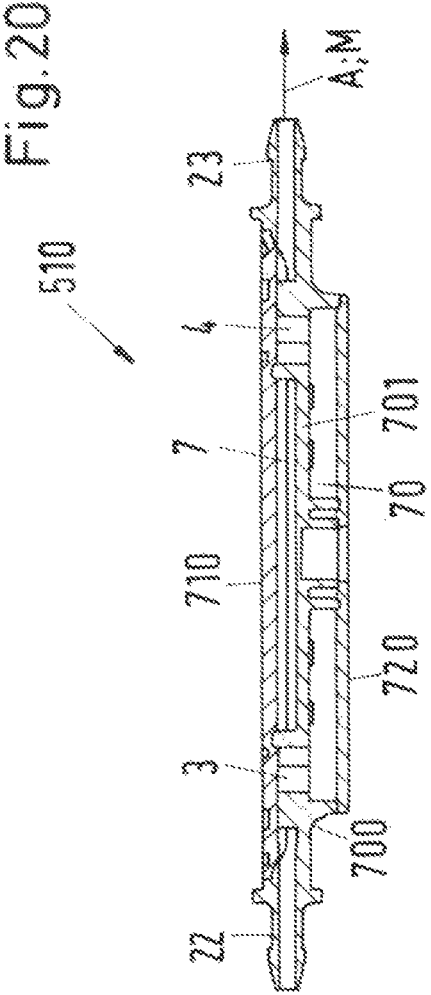
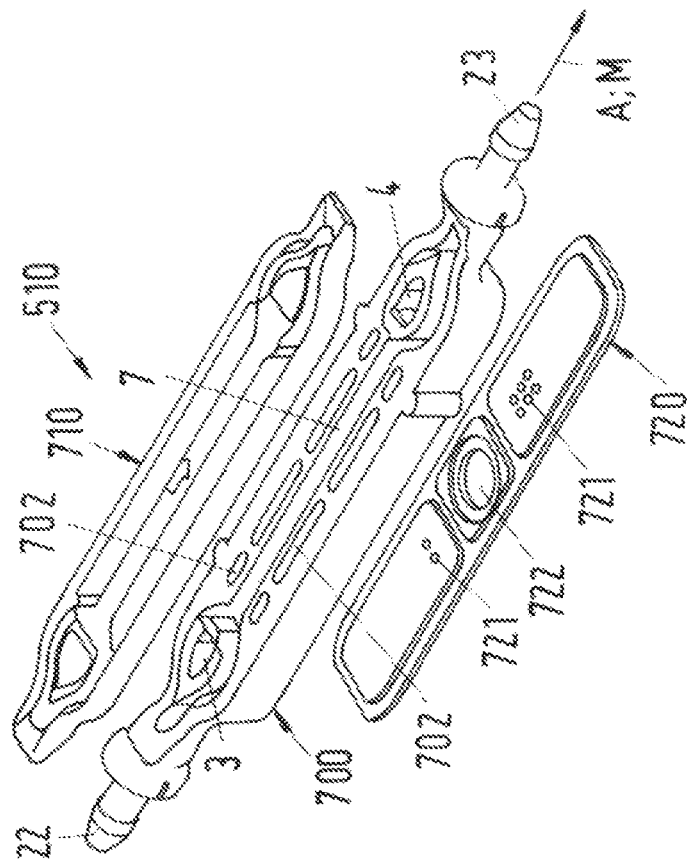

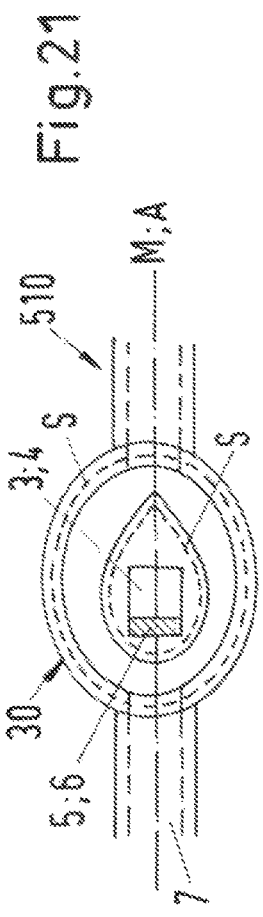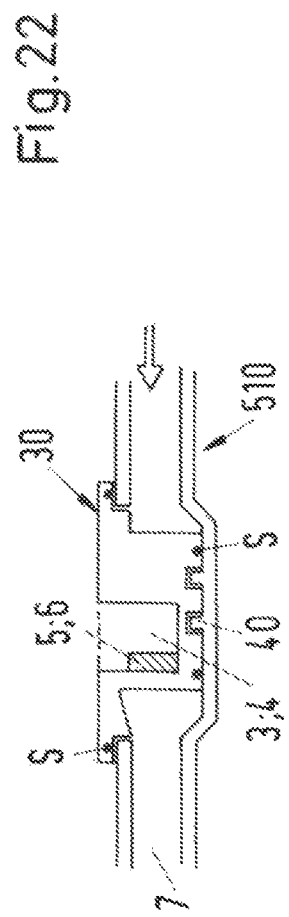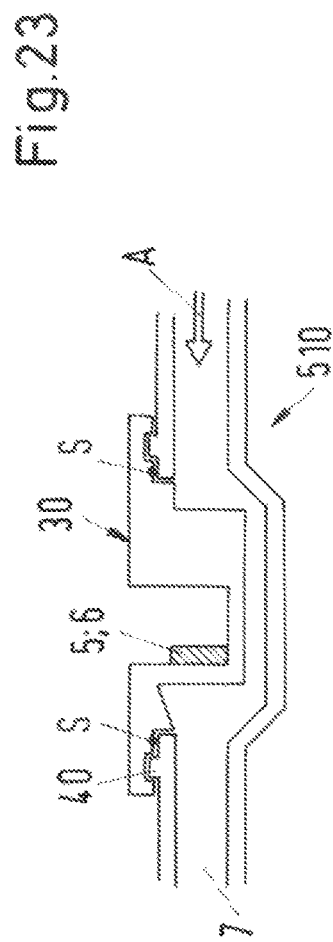

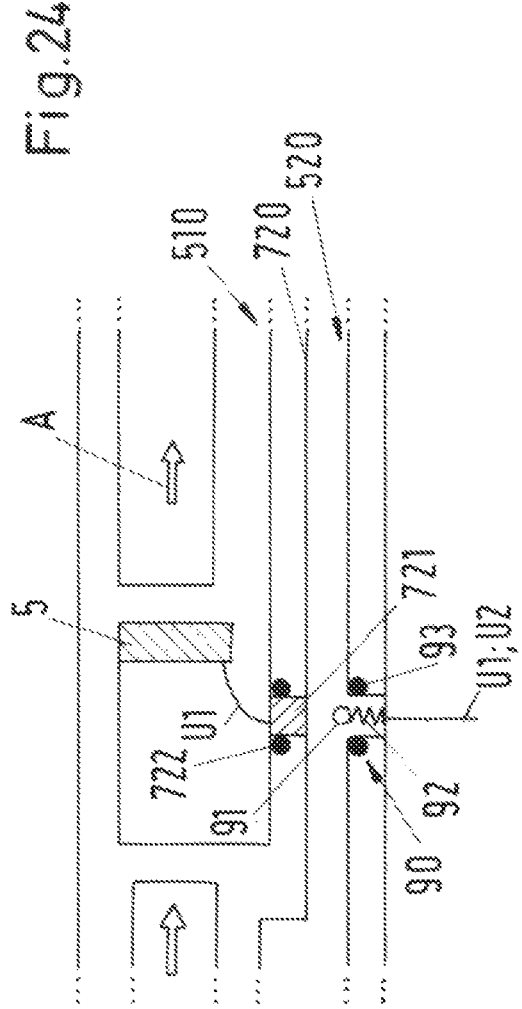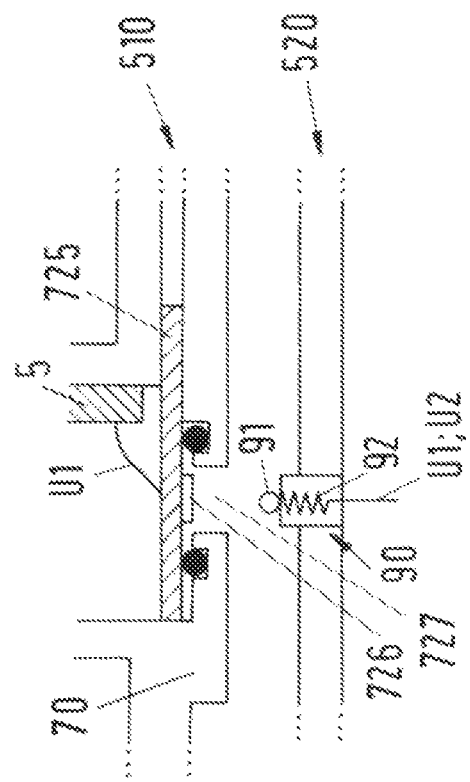

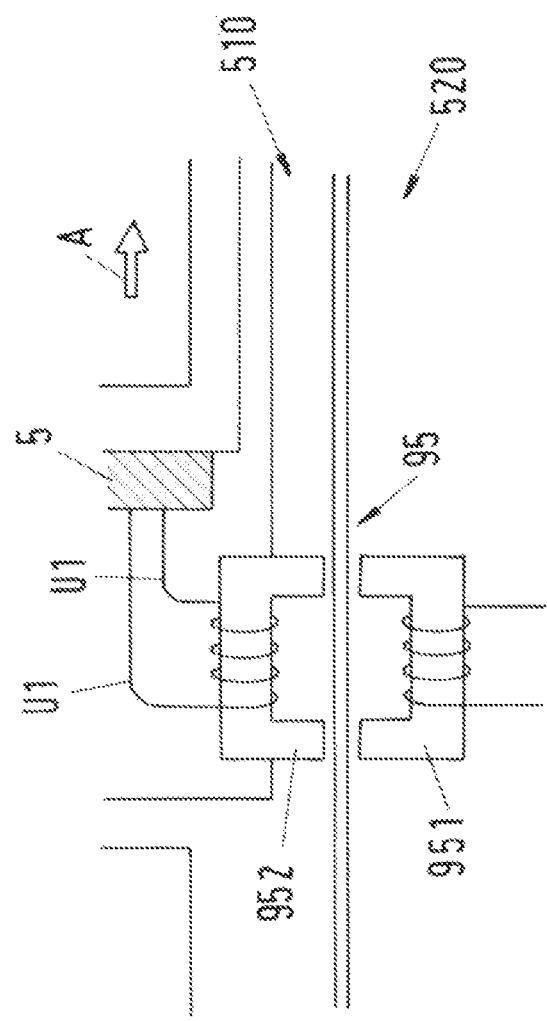

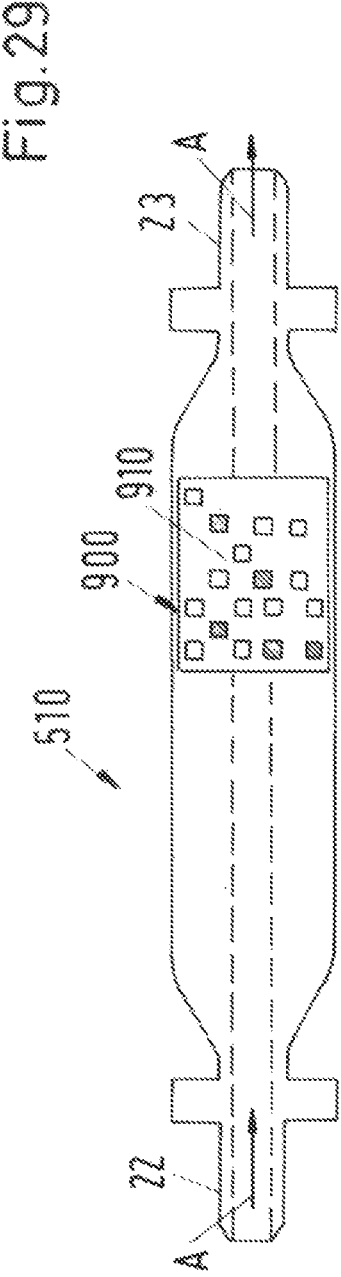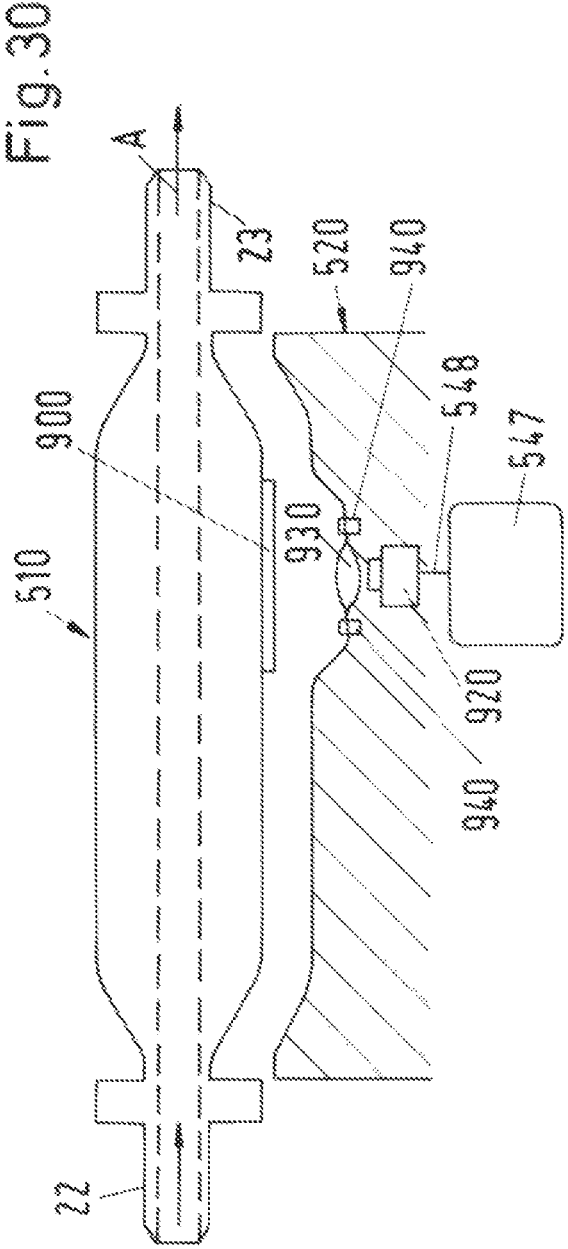

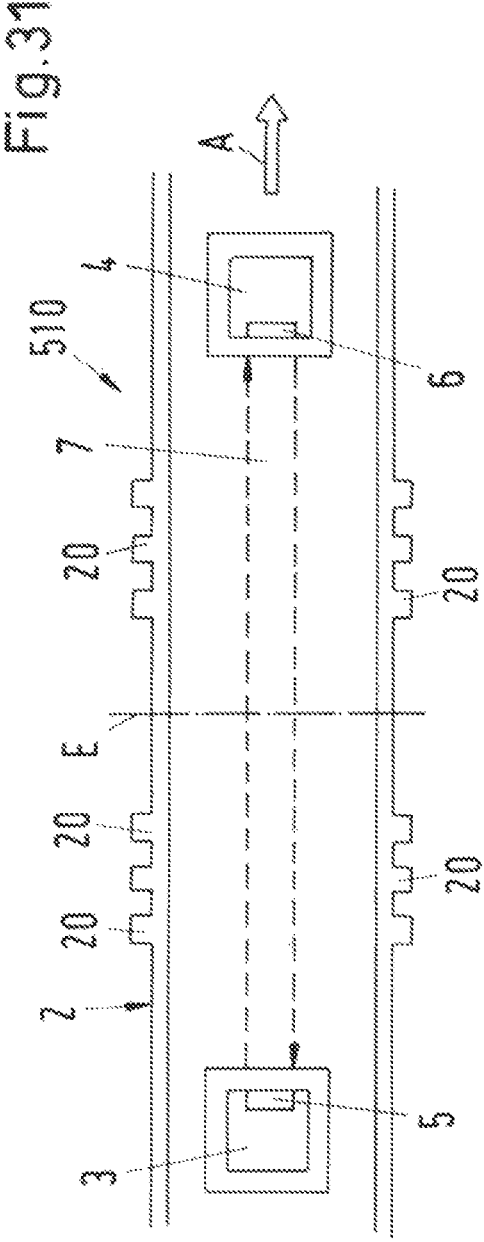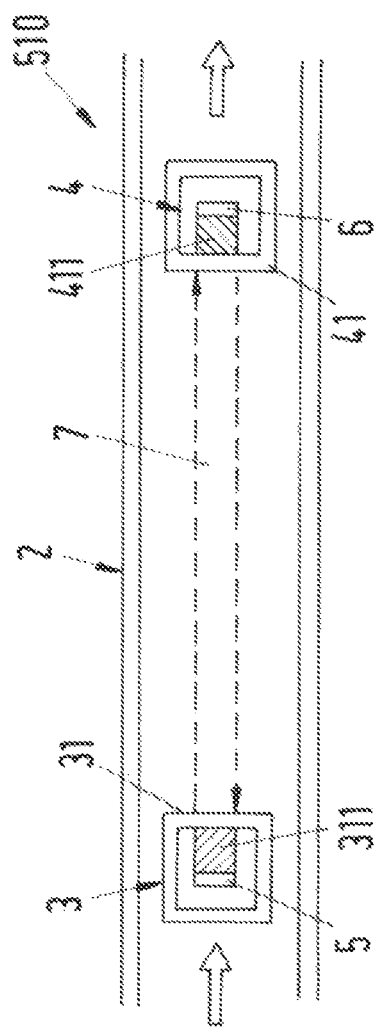

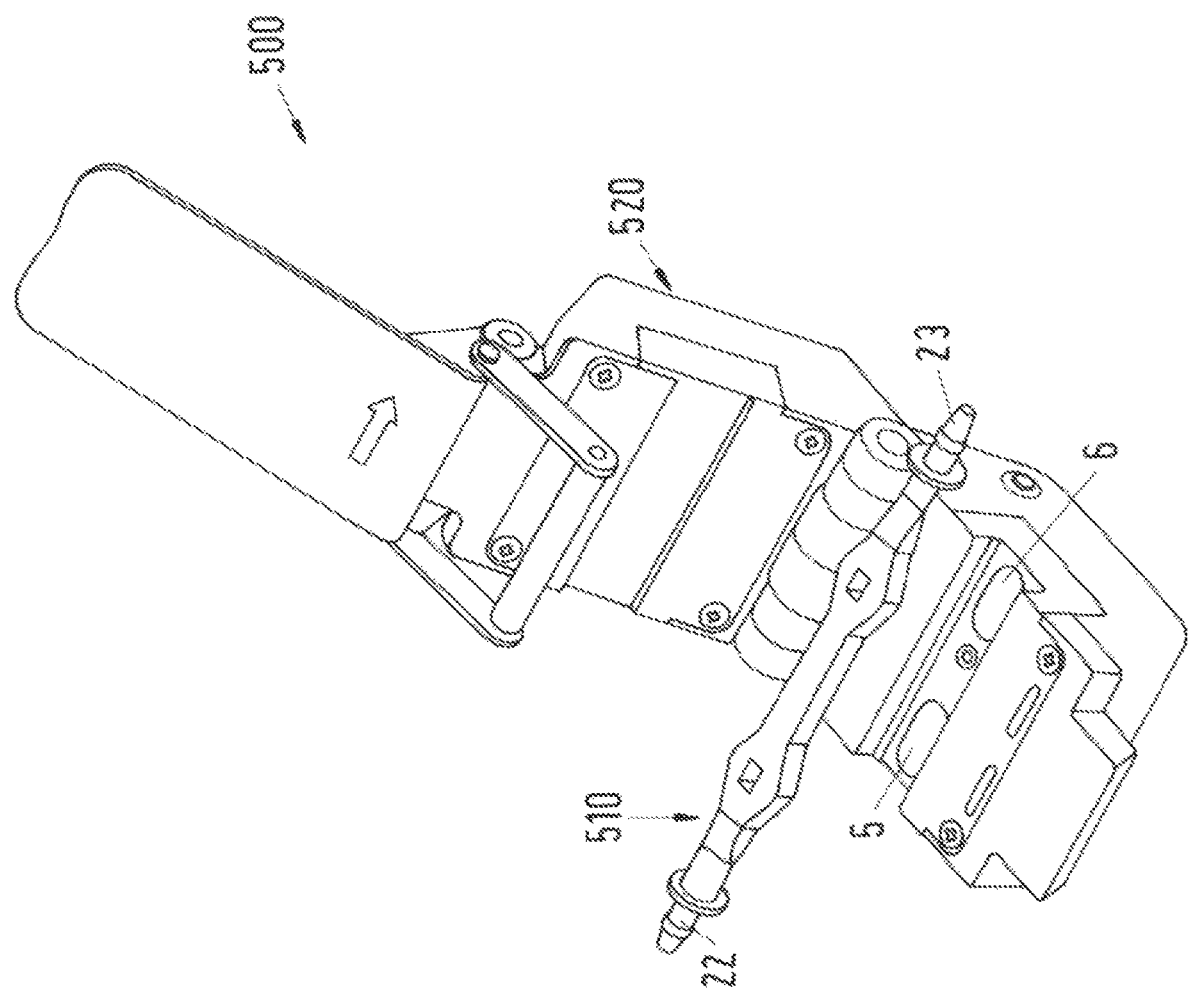

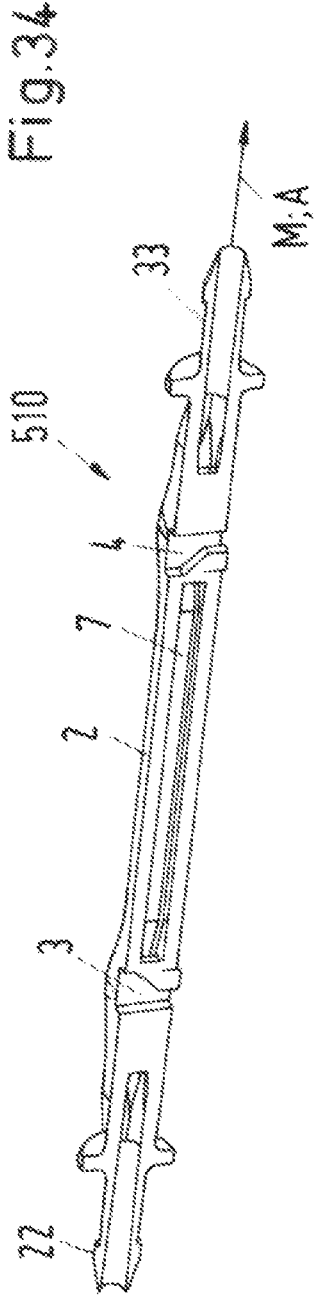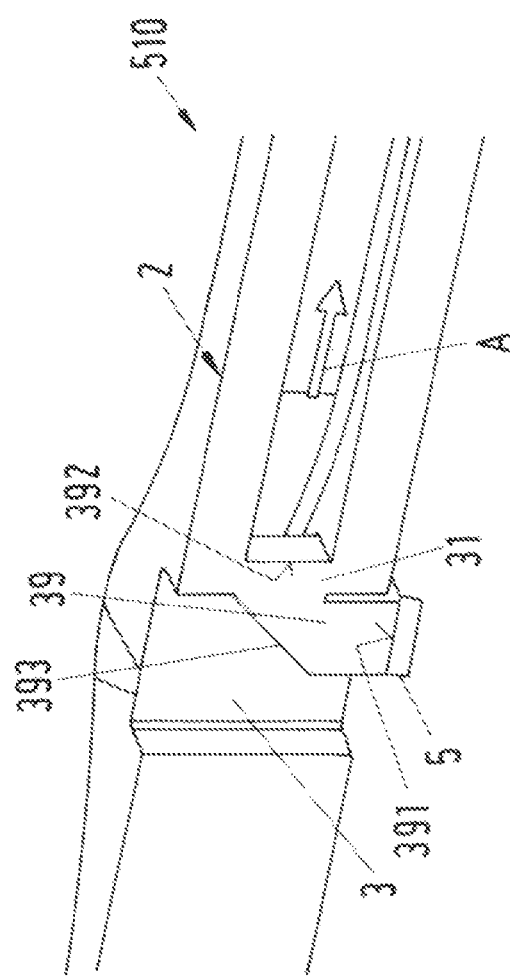

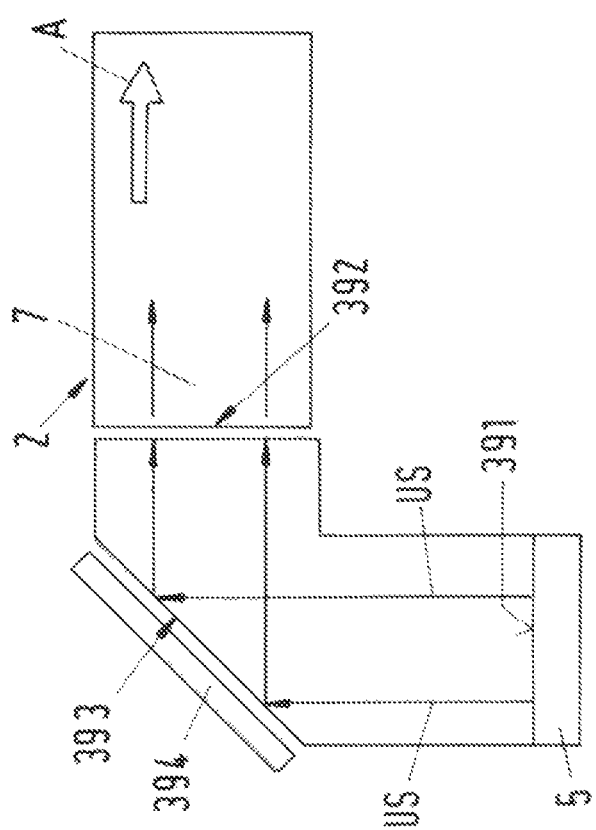

ULTRASONIC FLUID FLOW MEASURING SYSTEM WITH ULTRASONIC TRANSDUCERS PROVIDED IN CHAMBERS FORMED THROUGH THE PIPE WALL INTO THE FLOW PASSAGE

CROSS-REFERENCE TO RELATED APPLICATION

This application claims priority to European Patent Application No. 19188626.6, filed Jul. 26, 2019, the contents of which are hereby incorporated herein by reference in their entirety.

BACKGROUND

Field of the Invention

The invention relates to an ultrasonic measuring device for the measurement of a fluid flow and to an ultrasonic measuring system.

Background Information

Conventional ultrasonic measuring devices for the measurement of a fluid flow are used for example to determine the flow of the fluid through a pipe, for example a flexible or a hard plastic hose. In particular with flexible hoses, it is a well-known measure to design the measuring device as a clamping device such that it can be clamped onto a flexible pipe or that the pipe can be clamped by the measuring device. The pipe with the fluid flowing in it is then applied with ultrasonic signals. After passing through the pipe and the fluid, the ultrasonic signals are received by an ultrasonic transducer and the received signal is evaluated.

There are also ultrasonic measuring devices through which the fluid flows. Such measuring devices have a measuring, tube with an inlet for the fluid and an outlet for the fluid. The flowing fluid is then applied with ultrasonic signals in the measuring device.

SUMMARY

Both types of measuring devices have the advantage that they allow a non-invasive method of measurement on a flowing fluid. This non-invasive method is used in particular for such high-purity or very sensitive fluids, in which a contact between the fluid and the measuring device is to be avoided, so that the fluid is not contaminated, for example. The pharmaceutical industry and the biotechnological industry are examples of this. Here, solutions and suspensions are often produced and conveyed which place very high demands on the purity and/or the integrity of the fluid. In many cases, such fluids even have to be treated under sterile conditions. However, these non-invasive methods are also preferably used for measurements on chemically aggressive fluids, for example on acids, for example in the semiconductor industry.

In particular for measurements on very sensitive or very aggressive substances, the cleaning or sterilization of the measuring device represents a very large expenditure of time, material and costs. There is therefore a need to design the components coming into contact with the substances as single-use parts for single use. When designed for single use, those components that come into contact with the fluids to be treated are preferably used exactly once only and then replaced with new, i.e. unused, single-use parts for the next application. When manufacturing or designing single-use parts, it is an important criterion that they can be assembled with the other components of the measuring device in the simplest possible way. It is desirable that this assembly and of course also the separation can be carried out with as little effort as possible, with a few hand movements, quickly and preferably without tools.

Ultrasonic measuring devices, which are particularly suitable for the non-invasive measurement on high purity or aggressive substances, are offered and distributed by the applicant both as clamping devices and as flow-through measuring devices with a measuring tube under the trade name LEVIFLOW. Both designs basically work according to the same principle. At least two ultrasonic transducers are provided in each case, each of which can emit and receive an ultrasonic signal.

The ultrasonic transducers are arranged and aligned such that one ultrasonic transducer emits a signal that is aligned obliquely with the flow direction or in the flow direction, while the other ultrasonic transducer emits a signal that is aligned obliquely against the flow direction or against the flow direction. Then, a measuring signal is emitted by the first ultrasonic transducer which is received by the second ultrasonic transducer. Subsequently, a measuring signal is emitted by the second ultrasonic transducer, which is received by the first ultrasonic transducer.

The measuring signal emitted obliquely in or in the flow direction is accelerated in the flow and the measuring signal emitted obliquely against or against the flow direction is decelerated by the flow. The transit time difference of the two measuring signals is proportional to the flow velocity of the fluid, so that the flow through the pipe can be determined from this transit time difference.

Both designs have their advantages and disadvantages. In the case of devices designed as clamping devices, the first ultrasonic transducer is arranged on one side of the clamped pipe and the second ultrasonic transducer on the other side of the pipe. Both ultrasonic transducers are offset with respect to the flow direction of the fluid and aligned such that the first ultrasonic transducer can receive a signal emitted by the second ultrasonic transducer, and the second ultrasonic transducer can receive a signal emitted by the first ultrasonic transducer. Due to the offset to each other, the two ultrasonic transducers are aligned such that they emit their ultrasonic signals obliquely to the flow direction of the fluid in each case, Wherein one ultrasonic transducer emits the signal obliquely with the flow direction, while the other ultrasonic transducer emits the signal obliquely against the flow direction.

This design has the advantage that the flow of the fluid in the pipe is practically not influenced. The pipe is rectilinear. The flow is essentially free of turbulences and cavitation and there are no corners or peripheral areas where fluid stagnation, coagulation or other deposits can occur. In addition, such clamping devices can be designed very compact and space-saving. A disadvantage of this design is that the ultrasonic signals must be introduced into the fluid obliquely to the flow direction. The angle at which the ultrasonic signal propagates in the fluid after penetrating the pipe wall depends on the properties of the fluid, which can cause problems in detecting the ultrasonic signal. In addition, the measuring section is relatively short in this design, which results in a lower time resolution.

In the designs in which the measuring device has a measuring tube through which the fluid flows, the measuring tube usually has a U-shaped or a Z-shaped configuration. An inlet tube is provided which is arranged at right angles to a central part and an outlet tube which is also arranged at right angles to the central part. If the inlet tube is arranged on the same side as the outlet tube, a U-shaped design of the measuring tube results. If the inlet tube is arranged on the opposite side as the outlet tube, a Z-shaped design of the measuring tube results. The two ultrasonic transducers are then arranged outside the measuring tube, wherein one ultrasonic transducer is arranged at one end of the central part of the measuring tube and the other ultrasonic transducer at the other end of the central part. The central part of the measuring tube therefore serves as the measuring section.

This design has the advantage that both ultrasonic transducers can be arranged exactly at right angles to the measuring section. Thus, the ultrasonic signals can be introduced in each case into the measuring tube exactly in the flow direction or exactly against the flow direction of the fluid. In doing so, it can be ensured that the angle at which the ultrasonic signal propagates in the measuring tube is independent of the acoustic properties of the fluid. Furthermore, this design has the advantage that the measuring section can be made considerably longer than with the clamping devices. A longer measuring section has the advantage that the time resolution of the measurement increases.

A disadvantage of this design is that the fluid is deflected twice by 90° as it passes through the measuring tube, namely at the transition from the inlet tube to the central section and at the transition from the central section to the outlet tube. This double deflection causes turbulence and cavitation in the fluid as well as stagnations or even deposits of the fluid, in particular in the critical corner areas of the measuring tube. With biological fluids, clotting or coagulation can also occur. These effects particularly reduce the accuracy and reliability of the measurement. A further disadvantage of this design is its space requirement. The double bending of the measuring tube requires considerably more space for the measuring device.

Although both designs of the ultrasonic measuring devices have proven themselves very well in practice, there is still room for improvement with regard to ever higher requirements, for example with regard to measuring accuracy or the flexibility of the measuring device.

Starting from this state of the art, it is therefore an object of the invention to propose an ultrasonic measuring device for the measurement on a flowing fluid, which enables a very accurate determination of the flow rate. In particular, the device should enable an efficient introduction of the ultrasonic signal into the fluid, while at the same time significantly reducing turbulences and stagnations in the fluid. Furthermore, it is an object of the invention to propose an ultrasonic measuring system with such an ultrasonic measuring device, whereby in particular components of the ultrasonic measuring system are designed for single use.

The objects of the invention meeting this problem are characterized by the features discussed herein.

According to embodiments of the invention, an ultrasonic measuring device is thus proposed for the measurement of a fluid flow, having a measuring tube which has a central axis, which defines a flow direction for the fluid, having a first chamber in which a first ultrasonic transducer is arranged, and having a second chamber in which a second ultrasonic transducer is arranged, wherein the measuring tube has an inlet and an outlet for the fluid, wherein the first ultrasonic transducer and the second ultrasonic transducer bound a rectilinear measuring section for the fluid, wherein the first chamber and the second chamber are designed and arranged such that the fluid can flow around each of them, and wherein the first ultrasonic transducer and the second ultrasonic transducer are arranged such that the measuring section extends in the flow direction.

The two ultrasonic transducers are thus arranged in the flow of the fluid without coming into physical contact with the fluid, because the ultrasonic transducers are arranged in chambers so that the fluid in the measuring tube flows around the chambers with the ultrasonic transducers without being able to penetrate into these chambers.

The ultrasonic measuring device according to the embodiments of the invention thus makes it possible, on the one hand, to introduce measuring signals into the fluid in the flow direction or against the flow direction, wherein the measuring signals are not introduced obliquely to the flow direction, but their main direction of propagation forms an angle of 0° or 180° with the flow direction. Thus, the angle at which the respective measurement signal propagates in the fluid is no longer dependent on the acoustic properties of the fluid. Each measuring signal runs either in the flow direction of the fluid or against the flow direction of the fluid independent of the acoustic properties of the fluid. Due to the fact that the measuring signals propagate either in or against the flow direction of the fluid, the measuring section can also be made particularly long, resulting in a very high time resolution of the respective measurement.

In addition, the fluid in the measuring tube is not deflected at right angles, i.e. the flow of the fluid in the measuring tube is only slightly affected, if at all. In particular, the measuring tube has no corners or other critical areas that would cause significant stagnations, turbulence, or depositions of the fluid.

Furthermore, the ultrasonic measuring device according to the invention can be designed in a particularly space-saving manner, because no inlet or outlet tubes are required, which are arranged at an angle of about 90° to the measuring section. Both the inlet and the outlet of the measuring tube can be arranged in the central axis of the measuring tube.

Preferably, the first chamber and the second chamber are arranged in the measuring tube between the inlet and the outlet.

A further preferred measure is that the first ultrasonic transducer and the second ultrasonic transducer are arranged on the central axis of the measuring tube. This means that the fluid flows symmetrically around both ultrasonic transducers, resulting in a particularly low influence on the flow of the fluid.

According to a preferred embodiment, the measuring tube has a flow cross-section for the fluid between the first ultrasonic transducer and the second ultrasonic transducer, which flow cross-section is smaller than the flow cross-section at the inlet of the measuring tube. Due to this measure, the fluid flows on the measuring section at a higher speed than at the inlet of the measuring tube. In particular, the time resolution of the measurement can be increased with a higher flow velocity, because the transit time differences of the measuring signals in and against the flow direction is greater.

According to another preferred embodiment, the measuring tube has a substantially constant flow cross-section for the fluid between the first ultrasonic transducer and the second ultrasonic transducer. With this embodiment, turbulence or stagnations of the fluid in the measuring tube can be reduced particularly efficiently.

In particular, it is preferred that the first chamber is arranged closer to the inlet and the second chamber is arranged closer to the outlet, wherein the first chamber has a first flow guiding element on its side facing the inlet for reducing turbulences and/or wherein the second chamber has a second flow guiding element for reducing turbulence on its side facing the outlet for reducing turbulences. The flow of the fluid in front of the first chamber is divided particularly gently by the first flow guiding element into two partial flows, which flow around the first chamber on both sides without causing significant turbulence or the formation of stagnation zones. In an analogously similar manner, the second flow element ensures that the two partial flows which flow around the second chamber are brought together again as gently as possible downstream of the second chamber without causing significant turbulences or the formation of stagnation zones.

According to a preferred embodiment, the measuring section has a first end at the first ultrasonic transducer and a second end at the second ultrasonic transducer, wherein an acoustic lens for focusing ultrasonic signals is provided in each case at each end of the measuring section. Due to this measure, the measuring accuracy can be increased even further.

In order to influence the flow of the fluid in the measuring tube as little as possible and to reduce or even avoid turbulences and stagnation zones as much as possible, it is advantageous that the first chamber and the second chamber each have a substantially drop-shaped profile in the flow direction. In doing so, the two chambers are particularly streamlined.

It is a further preferred measure that the ultrasonic measuring device further comprises a temperature sensor for determining the temperature of the fluid. This enlarges the range of application of the measuring device, because in this way it is also possible to determine parameters of the fluid whose relationship to the speed of sound or sound attenuation is dependent on temperature.

It can also be advantageous that a third ultrasonic transducer and a fourth ultrasonic transducer are provided on the measuring tube, wherein the third and the fourth ultrasonic transducer lie opposite each other and are each arranged and aligned perpendicular to the flow direction for emitting an ultrasonic signal. This means that in this third and fourth ultrasonic transducer the respective emitting and receiving surfaces for the ultrasonic signals are aligned parallel to the flow direction, so that the main direction of propagation of the ultrasonic signals generated by the third and fourth ultrasonic transducer is perpendicular to the flow direction in each case. The third and the fourth ultrasonic transducers can therefore be advantageously used to determine the speed of sound in the fluid independently of the flow velocity of the fluid, and thus to determine parameters of the fluid which are dependent on the speed of sound or sound attenuation in the fluid.

It is a preferred embodiment that the ultrasonic measuring device is designed as a single-use part for single use.

Furthermore, a method for manufacturing an ultrasonic measuring device according to the invention is proposed, in which method the measuring tube, the first chamber and the second chamber are made of a plastic.

According to a preferred embodiment, the measuring tube and the two chambers are manufactured in one piece in a single blow molding process.

According to another preferred embodiment, the measuring tube and the two chambers consist of a plurality of individual parts, wherein each individual part is manufactured in an injection molding process, and the individual parts are subsequently joined, preferably welded, together.

It is particularly preferred that the measuring tube and the two chambers are formed from exactly two individual parts which are manufactured separately and are then welded together.

Furthermore, an ultrasonic measuring system for the measurement on a flowing fluid is proposed by the invention, with a single-use device designed for single use, with a reusable device designed for multiple use, with a first ultrasonic transducer, and with a second ultrasonic transducer.

The single-use device comprises a measuring tube, a first chamber and a second chamber, wherein the measuring tube has a central axis defining a flow direction for the fluid, wherein the first chamber is designed for emitting a signal of the first ultrasonic transducer, wherein the second chamber is designed for emitting a signal of the second ultrasonic transducer, wherein the measuring tube further has an inlet and an outlet for the fluid, wherein the first chamber and the second chamber bound a rectilinear measuring section for the fluid extending from the first chamber to the second chamber, wherein the first chamber and the second chamber are designed and arranged such that the fluid can flow around each of them, and that the measuring section extends in the flow direction.

The reusable device comprises a control device which is designed to actuate the ultrasonic transducers and to receive signals from the ultrasonic transducers.

The reusable device is detachably connectable to the single-use device so that the reusable device and the single-use device are fixed relative to each other.

According to the invention, an ultrasonic measuring system is thus proposed which comprises a single-use device which can only be used once as intended and must be replaced by a new, i.e. unused, single-use device for the next application, as well as a reusable device designed for multiple use. Furthermore, the first and the second ultrasonic transducers are provided, which, depending on their design, can be part of the single-use device or part of the reusable device.

Preferably, the ultrasonic measuring system comprises an ultrasonic measuring device according to the invention. Such embodiments are also possible in which the first and the second ultrasonic transducers are not directly arranged in the first and the second chamber respectively, but the signals of the two ultrasonic transducers are coupled into the two chambers, which is analogously effective with an arrangement of the ultrasonic transducers in the chambers.

In order to ensure that the connection between the single-use device and the reusable device is as easy to handle as possible, it is preferred that the single-use device and the reusable device can be connected together by a clamping connection.

Furthermore, it is preferred if the reusable device comprises a projection which engages in a recess in the single-use device when assembled with the single-use device. The projection and the recess are preferably designed for a form-locking cooperation, so that the single-use device can be easily placed on or removed from the reusable device.

Preferably, the first ultrasonic transducer and the second ultrasonic transducer are part of the single-use device, i.e. also designed for single use.

According to embodiments of the invention, a single-use device for an ultrasonic measuring system is further proposed, which is designed according to the invention.

Further advantageous measures and embodiments of the invention result from the dependent claims.

BRIEF DESCRIPTION OF THE DRAWINGS

The invention will be explained in more detail hereinafter with reference to the drawings.

FIG. 1 is a schematic sectional view of a first embodiment of an ultrasonic measuring device according to the invention, FIG. 2 is a schematic sectional view of a second embodiment of an ultrasonic measuring device according to the invention, FIG. 3 is a schematic sectional view of a third embodiment of an ultrasonic measuring device according to the invention, FIG. 4 is a schematic sectional view of a fourth embodiment of an ultrasonic measuring device according to the invention, FIG. 5 is a representation of a variant for the design of an acoustic lens, FIG. 6 is a schematic sectional view of a fifth embodiment of an ultrasonic measuring device according to the invention, FIG. 7 is a perspective representation of the fifth embodiment, FIG. 8 is a schematic sectional view of a first variant of the fifth embodiment, FIG. 9 is a schematic sectional view of a second variant of the fifth embodiment, FIG. 15 is a schematic representation of a first embodiment of an ultrasonic measuring system according to the invention, FIG. 16 is a perspective representation of a first variant of the first embodiment of the ultrasonic measuring system, FIG. 17 is the first variant from FIG. 16 from a different perspective, FIG. 18 is a perspective representation of a second variant of the first embodiment of the ultrasonic measuring system, FIG. 19 is a preferred embodiment of the single-use device in a perspective exploded view, FIG. 20 is the embodiment from FIG. 19 in a sectional view, FIG. 21 is a plan view on a chamber insert, FIG. 22 is a sectional view of the chamber insert in a section along the flow direction, FIG. 23 is a variant for the chamber insert in a representation analogous to FIG. 22, FIG. 24 is a possible embodiment for the signal connections enabling an electrical connection between the single-use device and the reusable device, FIG. 25 is a further possible embodiment for the signal connections enabling an electrical connection between the single-use device and the reusable device, FIG. 26 is a further possible embodiment for the signal connections enabling an electrical connection between the single-use device and the reusable device, FIG. 29 is a further embodiment for the communication between the single-use device and the storage interface of the reusable device, FIG. 30 is a section through the embodiment of FIG. 29 in a section along the flow direction, FIG. 31 is an advantageous measure for the embodiment of the single-use device, FIG. 32 is a further advantageous measure for the embodiment of the single-use device, FIG. 33 is a perspective view of a second embodiment of an ultrasonic measuring system according to the invention, FIG. 34 is a perspective sectional view of the single-use device of the second embodiment, FIG. 35 is an enlarged view of a detail of FIG. 34, and FIG. 36 is a schematic view to explain the coupling of the ultrasonic signal into the measuring section of the second embodiment.

DETAILED DESCRIPTION OF THE EMBODIMENTS

Figure 10:
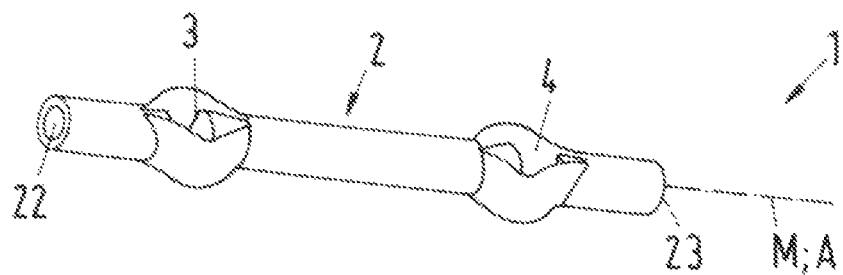
FIG. 10 is a perspective representation of an embodiment of the ultrasonic measuring device according to the invention, which has been manufactured in one piece.

FIG. 1 shows in a schematic sectional view a first embodiment of an ultrasonic measuring device according to the invention, which is referred to as a whole with the reference sign 1. The ultrasonic measuring device 1 is designed for the measurement of a fluid flow and comprises a measuring tube 2 through which the fluid flows. The measuring tube 2 has a central axis M, which defines a flow direction A for the fluid. In the first embodiment, the measuring tube 2 is designed as a cylindrical rectilinear tube with a circular cross-section perpendicular to its central axis M and has a wall 21 which laterally bounds measuring tube 2. The measuring tube 2 has an inlet 22 through which the fluid flows into the measuring tube 2 and an outlet 23 through which the fluid leaves the measuring tube 2, as indicated by the arrows without reference signs on the inlet 22 and the outlet 23. The inlet 22 and the outlet 23 are each designed as a circular area, the center of which each lies on the central axis M of the measuring tube 2. The measuring tube 2 has a substantially rectilinear, i.e. unbent and not angled design between the inlet 22 and the outlet 23. Due to this linear design of the measuring tube 2, the ultrasonic measuring device 1 has a particularly space-saving shape.

Furthermore, a first chamber 3 and a second chamber 4 are provided, wherein a first ultrasonic transducer 5 is arranged in the first chamber 3 and a second ultrasonic transducer 6 is arranged in the second chamber 4. The first ultrasonic transducer 5 and the second ultrasonic transducer 6 bound a rectilinear measuring section 7 for the fluid, which is located between the two ultrasonic transducers 5, 6. Each ultrasonic transducer 5, 6 is designed for the respective emission and reception of ultrasonic signals.

The first chamber 3 and the second chamber 4 are arranged in the measuring tube 2 between the inlet 22 and the outlet 23, wherein the first chamber 3 is arranged closer to the inlet 22 and the second chamber 4 closer to the outlet 23 of the measuring tube 2. The first chamber 3 and the second chamber 4 are each designed and arranged such that the fluid can flow around each of the two chambers 3 and 4 and the fluid cannot penetrate into the first and second chambers 3 or 4, so that the ultrasonic transducers 5, 6 do not come into contact with the fluid.

The first ultrasonic transducer 5 and the second ultrasonic transducer 6 are arranged and aligned such that they can exchange ultrasonic signals with each other, i.e. the second ultrasonic transducer 6 can receive an ultrasonic signal emitted by the first ultrasonic transducer 5 and the first ultrasonic transducer 5 can receive an ultrasonic signal emitted by the second ultrasonic transducer 6. Furthermore, the ultrasonic transducers 5,6 are arranged such that the measuring section 7 extends in the flow direction A. Due to this arrangement, the ultrasonic signals emitted by the two ultrasonic transducers 5, 6 as measuring signals are introduced in each case into the fluid either in the flow direction A or against the flow direction A, but not obliquely to the flow direction A. The main direction of propagation of the measuring signals thus includes an angle of 0° or 180° with the flow direction A. Thus, the angle at which the respective measuring signal propagates in the fluid is no longer dependent on the acoustic properties of the fluid. Each measuring signal runs independently of the acoustic properties of the fluid either in the flow direction A of the fluid or against the flow direction A of the fluid.

In the first embodiment, the first chamber 3 and the second chamber 4 are each designed as an inversion in the wall 21 of measuring tube 2. The first chamber 3 and the second chamber 4 are therefore each a recess in the wall 21 of the measuring tube 2, directed into the interior of the measuring tube 2. The first chamber and the second chamber 4 are each so deep that the first ultrasonic transducer 5 and the second ultrasonic transducer 6 can be arranged on the central axis M of the measuring tube 2. At the same time, the two ultrasonic transducers 5, 6 are protected from a contact with the fluid by the wall of the respective chamber 3 or 4.

The first chamber 3 is bounded on its side facing away from the inlet 22 by a first wall 31, which is designed as a planar, i.e. unbent wall, and which is perpendicular to the central axis M of the measuring tube 2 and thus perpendicular to the flow direction A. The first ultrasonic transducer 5 is arranged in the first chamber 3 on the first wall 31, so that the main direction of propagation of the measuring signals emitted by the first ultrasonic transducer 5 is in the flow direction A. The emitting and receiving surface of the first ultrasonic transducer 5 is thus perpendicular to the center axis M of the measuring tube 2.

The second chamber 4 is bounded on its side facing away from the outlet 23 by a second wall 41, which is designed as a planar, i.e. unbent wall, and which is perpendicular to the central axis M of the measuring tube 2 and thus perpendicular to the flow direction A. The second ultrasonic transducer 6 is arranged in the second chamber 4 on the second wall 41, so that the main direction of propagation of the measuring signals emitted by the second ultrasonic transducer 6 is against the flow direction A. The emitting and receiving surface of the second ultrasonic transducer 6 is thus perpendicular to the center axis M of the measuring tube 2.

The measuring tube 2 is designed such that it has a constant cross-sectional area perpendicular to the central axis M at least between the first wall 31 of the first chamber 3 and the second wall 41 of the second chamber 4, so that the flow cross-section for the fluid between the first ultrasonic transducer 5 and the second ultrasonic transducer 6 is at least substantially constant and preferably constant. With this design, turbulences or even stagnations of the fluid on the measuring section 7 between the first ultrasonic transducer 5 and the second ultrasonic transducer 6 can be particularly efficiently reduced or even avoided. The flow cross-section refers to the size of that area available to the fluid perpendicular to its flow direction. In the design according to the first embodiment, the flow cross-section along the measuring section is constant and corresponds to the circular area of the cylindrical measuring tube 2 perpendicular to the central axis A.

The design of the ultrasonic measuring device 1 has the relevant advantage that the ultrasonic signals serving as measuring signals can be introduced into the fluid at an angle of 0° or 180°—i.e. in particular not obliquely—to the flow direction A, and at the same time a particularly space-saving design of the ultrasonic measuring device 1 is possible because a L-shaped or a Z-shaped design of the ultrasonic measuring device can be dispensed with.

Since the measuring section 7 extends in the flow direction A, the measuring section 7 can also be designed considerably longer than in arrangements in which the measuring section is arranged obliquely or at an angle to the flow direction. A long measuring section 7 has the advantage that it allows a considerably higher time resolution and thus a higher measuring accuracy.

Each of the ultrasonic transducers 5, 6 is signal-connected to a control device (not shown) via a respective signal line (not shown) in a manner known per se. The control device controls the ultrasonic transducers 5, 6 via the respective signal line to emit ultrasonic signals and receives the signals received by the ultrasonic transducers 5, 6. The measuring signals received by the ultrasonic transducers 5, 6 are transmitted to an evaluation unit (not shown), which can be integrated in the control device. The received measuring signals are analyzed and evaluated in the evaluation unit. Preferably, at least the flow velocity and thus the flow rate of the fluid is determined in the evaluation unit. The control device and the evaluation unit can also be integrated in a regulation device which regulates the flow of the fluid.

The ultrasonic transducers 5, 6 can be designed in any manner known per se, in particular as piezoelectric transducers. The frequency of the ultrasonic signals is typically in the megahertz range, for example in the range from 1 MHz to 30 MHz.

The first ultrasonic transducer 5 and the second ultrasonic transducer 6 are arranged such that the first ultrasonic transducer 5 can emit a first measuring signal to the second ultrasonic transducer 6 in the flow direction A, and can receive a second measuring signal emitted by the second ultrasonic transducer 6 against the flow direction.

The direction of the ultrasonic signal means the main direction of propagation of the ultrasonic signal emitted by the corresponding ultrasonic transducer 5, 6. The main direction of propagation is usually perpendicular to the surface of the piezoelectric element which forms the emitting and receiving surface of the corresponding ultrasonic transducer 5, 6.

To determine the flow of the fluid, the measuring tube 2 is installed in the flow path of the fluid so that the fluid flows into the measuring tube 2 through the inlet 22 and leaves the measuring tube 2 through the outlet 23.

The first ultrasonic transducer 5 emits a first measuring signal, wherein the first measuring signal is emitted in the flow direction A, i.e. parallel to the central axis M of the measuring tube 2. The first measuring signal is received by the second ultrasonic transducer 6 after passing through the measuring section 7 and transmitted to the evaluation unit.

A second measuring signal is emitted by the second ultrasonic transducer 6, wherein the second measuring signal is also emitted parallel to the central axis I\1 of the measuring tube 2 but against the flow direction A. The second measuring signal is received by the first ultrasonic transducer 5 after passing through the measuring section 7 and transmitted to the evaluation unit.

The transit time difference between the first measuring signal and the second measuring signal is determined in the evaluation unit, i.e. between that measuring signal which was accelerated by the flowing fluid and that measuring signal which was decelerated by the flowing fluid. This transit time difference between the measuring signal in the flow direction A and the measuring signal against the flow direction A is directly dependent on the flow velocity of the fluid in the measuring tube 2. Thus, the flow velocity and thus the flow of the fluid through the measuring tube 2 can be determined from the transit time difference.

Figure 12:
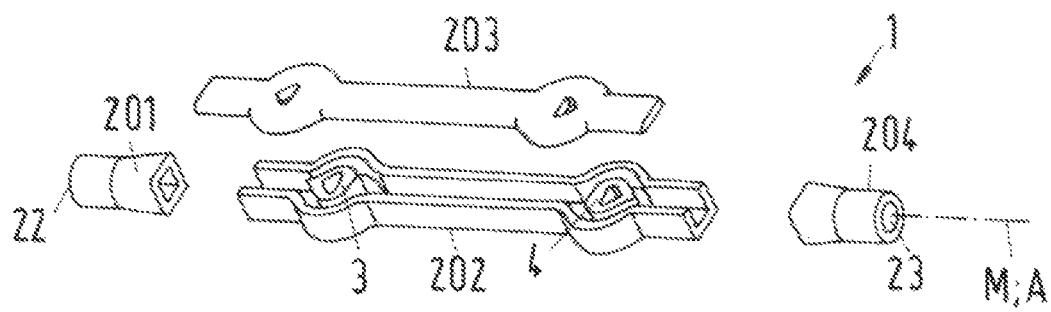
Figure 13:
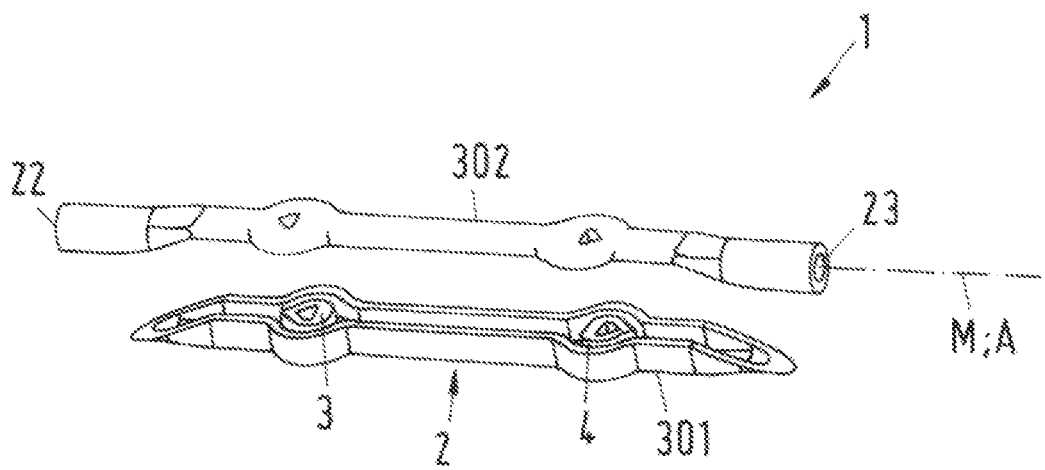
Figure 14:
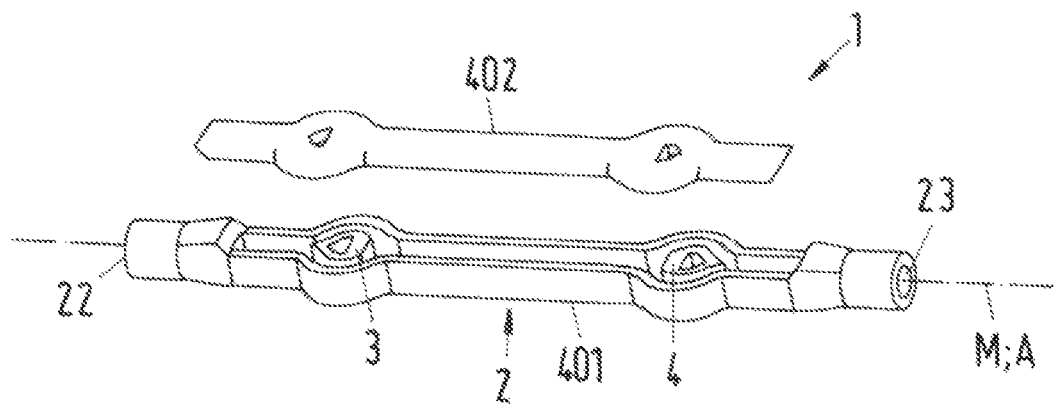

In addition to the length of the measuring section 7, it is particularly advantageous that the measuring tube 2 does not have any bending but is substantially rectilinear. The cylindrical design of the measuring tube 2 at least between the first chamber 3 and the second chamber 4 is of course not mandatory. Of course, the measuring tube 2 can also be designed with a rectangular or square cross-section perpendicular to its central axis M. The flow cross-section on the measuring section 7 is then the area of the rectangle or square in a section perpendicular to the central axis M. It is also absolutely not necessary that the cross-section of the measuring tube 2 is constant in shape over the entire measuring tube 2. Embodiments of the measuring tube 2 are shown in FIGS. 12 to 14, for example, in which the measuring tube 2 has a circular area in each case at the inlet 22 and the outlet 23 as a cross-section perpendicular to the central axis M, and in the area between the first chamber 3 and the second chamber 4 a rectangle or a square as a cross-section perpendicular to the central axis M.

FIG. 2 shows in a schematic sectional view a second embodiment of an ultrasonic measuring device 1 according to the invention in a representation analogous to FIG. 1. In the following description of the second embodiment, only the differences to the first embodiment are discussed in more detail. Otherwise, the explanations concerning the first embodiment also apply to the second embodiment in the same way or in the analogously same way. In the second embodiment, the same parts or parts with the same function are referred to with the same reference signs as in the first embodiment.

The second embodiment of the ultrasonic measuring device 1 according to the invention differs from the first embodiment mainly in the design of the first and the second chamber 3 or 4. In the second embodiment, the first chamber 3 and the second chamber 4 are each designed such that they extend as a channel completely through the measuring tube 2, wherein the longitudinal extension of each chamber 3, 4 is perpendicular to the central axis M of the measuring tube 2. The chambers 3, 4 thus each form in a column, which is arranged in the measuring tube 2 perpendicular to the central axis M and which each extends completely through the measuring tube 2 and the wall 21 bounding it. Each chamber 3, 4 is protected against the penetration of the fluid by the walls bounding it perpendicular to the central axis M. In a section along the central axis M—as is represented in FIG. 2—each chamber 3, 4 has a rectangular cross-sectional area. In particular, the first wall 31 of the first chamber 3 and the second wall 41 of the second chamber 4 are each designed again as a planar, i.e. unbent wall, which is perpendicular to the central axis M of the measuring tube 2.

FIG. 3 shows a schematic sectional view of a third embodiment of an ultrasonic measuring device 1 according to the invention in a representation analogous to FIG. 2. In the following description of the third embodiment, only the differences to the previously described embodiments will be discussed in more detail. Otherwise, the explanations concerning the previously described embodiments also apply in the same way or in the analogously same way to the third embodiment. In the third embodiment, the same parts or parts with the same function are referred to with the same reference signs as in the previously described embodiments.

The third embodiment of the ultrasonic measuring device 1 according to the invention is designed in a similar manner as the second embodiment (FIG. 2). However, in the third embodiment, the measuring tube 2 is designed with a tapered area 25, which, viewed in the flow direction A, is arranged between the first chamber 3 and the second chamber 4. In the tapered area 25, the measuring tube 2 has a smaller flow cross-section than at the inlet 22, where the measuring tube 2 has a larger flow cross-section. This means that the measuring tube 2 has a flow cross-section for the fluid between the first ultrasonic transducer 5 and the second ultrasonic transducer 6 that is smaller than the flow cross-section at the inlet 22.

The measuring tube 2 again has a larger flow cross-section downstream of the second chamber 4 and in particular at the outlet 23 than in the tapered area 25. Preferably, the flow cross-section of the measuring tube 2 at the outlet 23 is the same size as at the inlet 22. Viewed in the flow direction A, the measuring tube 2 has the larger flow cross-section at the inlet, then tapers in the area of the first chamber 3 to the smaller flow cross-section and then widens again in the area of the second chamber 4 to the larger flow cross-section, which the measuring tube 2 also has at the outlet 22.

This embodiment has the advantage that the fluid in the tapered area 25 and thus also on the measuring section 7 has a higher flow velocity than at the inlet 22 of the measuring tube 2. Due to this measure, the transit time difference between that measuring signal, which is accelerated by the flowing fluid, and that measuring signal, which is decelerated by the flowing fluid, can be increased. This means an advantageous higher resolution of the measurement.

FIG. 4 shows in a schematic sectional view a fourth embodiment of an ultrasonic measuring device 1 according to the invention in a representation analogous to FIG. 3. In the following description of the fourth embodiment, only the differences to the previously described embodiments will be discussed in more detail. Otherwise, the explanations concerning the previously described embodiments also apply in the same way or in the analogously same way to the fourth embodiment. In the fourth embodiment, the same parts or parts with the same function are referred to with the same reference signs as in the previously described embodiments.

The fourth embodiment of the ultrasonic measuring device 1 according to the invention is designed in a similar manner as the third embodiment (FIG. 3) but can of course also be designed in a similar manner as the first (FIG. 1) or the second embodiment (FIG. 2), i.e. without the tapered area 25.

In the fourth embodiment of the ultrasonic measuring device 1 according to the invention, the first chamber 3 has a first flow guiding element 51 on its side facing the inlet 22, which is designed in such a way that it divides the fluid flow in front of the first chamber 3, viewed in the flow direction A, as gently as possible into two partial flows S1 and S2, of which one, namely the partial flow S1, is guided around above the first chamber 3, according to the representation, and the other, namely the partial flow S2, is guided around below the first chamber 3, according to the representation. For this purpose, the first flow guiding element 51, for example, has a triangular cross-section when viewed in the flow direction A, and in particular the cross-section of an isosceles triangle, the tip of which faces the inlet 22 and the base of which lies flush with the first chamber 3. Due to this design, the fluid is divided into two essentially equally strong partial flows S1, S2 and undesirable flow phenomena, such as turbulence, cavitation or the formation of stagnation areas, can at least be significantly reduced. The triangular design of the first flow guiding element 51 is to be understood as an example. Other streamlined embodiments are also possible, with which the fluid flow can be divided as gently as possible into the two partial flows S1 and S2.

Preferably, the second chamber 4 has a second flow guiding element 52 on its side facing the outlet 23, which is designed in such a way that it merges the two partial flows S1 and S2 as gently as possible behind the second chamber 4, when viewed in the flow direction A. For this purpose, the second flow guiding element 52—in an analogously same way as the first flow guiding element 51—has a triangular cross-section, for example, when viewed in the flow direction A, and in particular the cross-section of an isosceles triangle, the tip of which faces the outlet 23 and the base of which lies flush with the first chamber 4.

As a further optional measure, one or a plurality of acoustic lens(es) 61, 62 can be provided to focus the ultrasonic signals or the measuring signals. These acoustic lenses 61 and/or 62 can of course also be provided for the other embodiments.

In the fourth embodiment represented in FIG. 4, a total of two acoustic lenses 61, 62 are provided, namely one at each end of the measuring section 7. The measuring section 7 has a first end at the first ultrasonic transducer 5 and a second end at the second ultrasonic transducer 6. A first acoustic lens 61 is arranged at the first end of the measuring section 7, and a second acoustic lens 62 is arranged at the second end of the measuring section 7. The first acoustic lens 61 is preferably arranged externally on the first wall 31 of the first chamber 3 and the second acoustic lens 62 is preferably arranged externally on the second wall 41 of the second chamber 4. Both acoustic lenses 61 and 62 can be designed in a manner known per se in such a way that they focus or parallelize the emitted ultrasonic signals and direct the ultrasonic signals to be received to the respective ultrasonic transducer 5, 6. Preferably, the acoustic lenses 61, 62 are each designed in an analogously same way as the flow guiding elements 51, 52 such that they divide the fluid flow as gently as possible (second acoustic lens 62) or merge it as gently as possible (first acoustic lens 61), so that turbulences in the fluid flow are at least reduced. The triangular embodiment of the acoustic lenses 61, 62 is to be understood as an example. Other embodiments are also possible, for example convex and concave curves, with which the ultrasonic signals can be focused or parallelized.

In the fourth embodiment, the two acoustic lenses 61, 62 are each designed with a triangular cross-section, when viewed in the flow direction A, in particular with a cross-section which is an isosceles triangle. The acoustic lenses 61, 62 are arranged in such a way that the tips of the two isosceles triangles are opposite each other and their bases are flush with the first wall 31 or the second wall 41.

Preferably, the two acoustic lenses 61, 62 are made of a material that has the same acoustic properties as the fluid so that there is no change in the angle in the main direction of propagation of the ultrasonic signals at the respective boundary surface between the acoustic lens 61 or 62 and the fluid.

FIG. 5 shows a variant for the design of the two acoustic lenses 61, 62. In this variant, the two legs of the isosceles triangular cross-sectional area of each acoustic lens 61, 62 each have a step structure 65, so that each ultrasonic signal or each measuring signal, which are represented in FIG. 5 by the dotted arrows without reference signs, each strike a boundary surface between the acoustic lens 61, 62 which is perpendicular to its main direction of propagation, so that there is no change with respect to the angle of signal propagation at this boundary surface.

FIG. 6 shows in a schematic sectional view a fifth embodiment of an ultrasonic measuring device 1 according to the invention in a representation analogous to FIG. 4. In the following description of the fifth embodiment, only the differences to the previously described embodiments will be discussed in more detail. Otherwise, the explanations concerning the previously described embodiments also apply in the same way or in the analogously same way to the fifth embodiment. In the fifth embodiment, the same parts or parts with the same function are referred to with the same reference signs as in the previously described embodiments.

For better understanding, FIG. 7 additionally shows a perspective view of the fifth embodiment of the ultrasonic measuring device 1 according to the invention.

In the fifth embodiment of the ultrasonic measuring device 1 according to the invention, the first chamber 3 and the second chamber 4 are each designed in such a way that the first flow guiding element 51 is an integral part of the first chamber 3 and the second flow guiding element 52 is an integral part of the second chamber 4.

For this purpose, the first chamber 3 and the second chamber 4 are each designed such that they each have a substantially drop-shaped profile when viewed in the flow direction A. The tip of the drop-shaped profile of the first chamber 3 is directed towards the inlet 22 and the tip of the drop-shaped profile of the second chamber 4 is directed towards the outlet 23. The bottom of the drop-shaped profile forms the first wall 31 at the first chamber 3 and the second wall 41 at the second chamber, wherein the first ultrasonic transducer 5 is arranged on the first wall 31 within the first chamber 3, and the second ultrasonic transducer 6 is arranged on the second wall 41 within the second chamber 4. The aim of this design is a most streamlined possible design of the two chambers 3, 4, wherein a planar surface is simultaneously provided in each case, namely the first wall 31 and the second wall 41, on which the two ultrasonic transducers 5, 6 can be arranged in such a way that the main direction of propagation of the ultrasonic signals emitted by them is in or opposite to the flow direction A.

Furthermore, the measuring tube 2, including the two chambers 3 and 4, is preferably designed symmetrically with respect to the central axis M. If the measuring tube 2—as represented in FIG. 7—is designed cylindrically, the measuring tube 2 including the two chambers 3 and 4 is preferably rotationally symmetrical with respect to the central axis M.

In the fifth embodiment, the measuring tube 2 is designed in such a way that it has an at least approximately constant flow cross-section for the fluid from the inlet 22 to the outlet 23, so that the fluid flows through the measuring tube 2 at a constant velocity.

For this purpose, the measuring tube 2 has a first bulge 26 in the area of the first chamber 3 and a second bulge 27 in the area of the second chamber 4, through which the fluid can flow around the respective chamber 3 or 4.

In the area of the first chamber 3, the first chamber 3 together with the first bulge 26 of the wall 21 of the measuring tube 2 bounds two first partial channels 35, which extend around the first chamber 3. The total flow of the fluid, which is represented in FIG. 6 by the arrow with the reference sign G at the inlet 22 of the measuring tube 2, is divided by the first flow guiding element 51 into the two partial flows S1 and S2, of which one flows through the first partial channel 35, which is upper according to the representation, around the first chamber 3, and the other flows through the first partial channel 35, which is lower according to the representation, around the first chamber 3. Downstream of the first chamber 3, the two partial streams S1 and S2 are merged again by the first bulge 26 in the wall 21 of the measuring tube 2.

In the area of the second chamber 4, the first chamber 4 together with the second bulge 27 of the wall 21 of measuring tube 2 bounds two second partial channels 45, which extend around the second chamber 4. The fluid flow is again divided by the second wall 41 of the second chamber 4 into the two partial flows S1 and S2, of which one flows through the second partial channel 45, which is upper according to the representation, around the second chamber 4, and the other flows through the second partial channel 45, which is lower according to the representation, around the second chamber 4. Downstream of the second chamber 4, the two partial flows S1 and S2 are merged again by the second flow guiding element 52 and the second bulge 27 in the wall 21 of measuring tube 2. The total flow of the fluid then flows out of the measuring tube 2 through the outlet 23, as represented in FIG. 6 by the arrow with the reference sign G at the outlet 23.

As already mentioned, the measuring tube 2 is designed such that it has a constant flow cross-section between the inlet 22 and the outlet 23. This means that the cross-sectional area for the fluid flow at the inlet of the measuring tube 2 is as large as the sum of the cross-sectional areas of the two first partial channels 35, and as large as the sum of the cross-sectional areas of the two second partial channels 45, and as large as the cross-sectional area at the outlet 23 of the measuring tube 2, so that the measuring tube 2 has a constant flow cross-section for the fluid over its entire length from the inlet 22 to the outlet 23.

Preferably, all four partial channels, namely the two first partial channels 35 and the two second partial channels 45, each have the same flow cross-section, i.e. all four partial channels 35, 45 have the same cross-sectional area.

Due to this high symmetry in connection with the streamlined, in particular drop-shaped profile of both the first chamber 3 and the second chamber 4, particularly favorable flow conditions can be achieved in the measuring tube 2. The fluid flows with constant flow velocity and with only very gentle deflections from the rectilinearity through the entire measuring tube 2. In doing so, a flow of the fluid, which is substantially free of turbulences or turbulence zones, can be achieved, in particular on the measuring section 7 between the two ultrasonic transducers 5, 6. Furthermore, undesirable stagnation areas or deposits or coagulation of the fluid can at least be significantly reduced.

FIG. 8 shows in a schematic sectional view a first variant of the fifth embodiment of the ultrasonic measuring device 1 according to the invention. In this first variant, the two acoustic lenses 61, 62 are provided for focusing or parallelizing the ultrasonic signals, in the analogously same way as explained in connection with the fourth embodiment.

The first acoustic lens 61 is preferably arranged externally on the first wall 31 of the first chamber 3 and the second acoustic lens 62 is preferably arranged externally on the second wall 41 of the second chamber 4. Both acoustic lenses 61 and 62 can be designed in a manner known per se in such a way that they focus or parallelize the emitted ultrasonic signals and direct the ultrasonic signals to be received to the respective ultrasonic transducer 5, 6.

In the first variant of the fifth embodiment described here, the two acoustic lenses 61, 62 are each designed and arranged as represented in FIG. 5 and explained in connection with FIG. 5.

FIG. 9 shows in a schematic sectional view a second variant of the fifth embodiment of the ultrasonic measuring device 1 according to the invention. In this second variant, a temperature sensor 8 is additionally provided to determine the temperature of the fluid. The temperature sensor 8 is arranged here on or in the wall 21 of the measuring tube 2 and, with respect to flow direction A, between the two chambers 3, 4. The temperature sensor 8 can be signal-connected with the control unit and with the evaluation unit.

One possibility of arranging the temperature sensor 8 is to provide a continuous hole in the wall 21, for example a bore, and to arrange the temperature sensor 8 in this hole in such a way that the temperature sensor 8 is directly immersed in the fluid, i.e. has direct physical contact with the fluid. If the fluid is a biological substance, the part of the temperature sensor 8 that comes into contact with the fluid should be made of a material that does not contaminate or otherwise adversely affect the fluid. A suitable material is stainless steel, for example. If the fluid is or contains a biological material, the feedthrough where the temperature sensor 8 penetrates the wall 21 should be sealed in a biocompatible manner.

Another possibility is to avoid direct physical contact between the fluid and the temperature sensor 8, for example by providing the temperature sensor 8 on the outside of the wall 21. The difference between the real temperature of the fluid and the temperature determined by the temperature sensor 8 caused by the wall 21 can be determined by calibration measurements, for example, so that subsequently the temperature of the fluid in the measuring tube 2 can be determined from the temperature determined by the temperature sensor 8. Here, it can be advantageous to provide a clearance on the outside of the wall 21 so that wall 21 has a smaller thickness there. The temperature sensor 8 can then be arranged in this clearance and, due to the thinner wall there, can measure a temperature that is significantly closer to the temperature of the fluid flowing in the measuring tube 2.

Avoiding direct physical contact between the temperature sensor 8 and the fluid in the measuring tube 2 can be particularly advantageous in such applications where very high demands are placed on the purity of the fluid and the contact with the temperature sensor 8 presents a risk of contamination. Even with very aggressive fluids in the measuring tube 2, for example acids such as those used in the semiconductor industry, it can be advantageous to avoid a direct physical contact between the temperature sensor 8 and the fluid in the measuring tube 2.

Furthermore, there may be applications in which the feedthrough through which the temperature sensor reaches into the measuring tube cannot be sealed in the desired way, for example in a biocompatible manner, or can only be sealed with great effort. Even for these applications, a design is preferred in which direct physical contact between the fluid flowing in measuring tube 2 and the temperature sensor 8 is avoided.

To determine the temperature of the fluid flowing in the measuring tube 2 by the temperature sensor 8 has the advantage that temperature-dependent effects can be compensated for measurements of the flow rate.

As a further measure, which can of course also be realized independently of the temperature sensor 8, i.e. without the temperature sensor 8, a third ultrasonic transducer 9 and a fourth ultrasonic transducer 10 are provided on the measuring tube 2 in the second variant of the fifth embodiment. The third and fourth ultrasonic transducers 9, 10 are each arranged on the outside of the wall 21 of the measuring tube 2 and aligned in such a way that they can each emit and receive an ultrasonic signal perpendicular to the flow direction A. In FIG. 9, the ultrasonic signal emitted by the third ultrasonic transducer 9 is represented by the dotted arrow with the reference sign S9, and the signal emitted by the fourth ultrasonic transducer 10 is represented by the dotted arrow with the reference sign S10. The third ultrasonic transducer 9 and the fourth ultrasonic transducer S10 are arranged opposite each other on the wall 21, so that the fourth ultrasonic transducer 10 can receive a signal S9 emitted by the third ultrasonic transducer 9 perpendicular to flow direction A, and conversely, the third ultrasonic transducer 9 can receive a signal S10 emitted by the fourth ultrasonic transducer 10 perpendicular to flow direction A.

It is understood that the third ultrasonic transducer 9 and the fourth ultrasonic transducer 10 can also be signal-connected to the control unit or the evaluation unit.

In addition to the measurement signals which have passed through the flowing fluid in the flow direction A and against the flow direction A, the evaluation unit thus also receives measuring signals which have passed through the fluid perpendicular to flow direction A. Then, the evaluation unit can analyze or evaluate these measuring signals, which have passed through the fluid perpendicular to the flow direction A, with respect to their transit time through the fluid, their attenuation by the fluid or, of course, with respect to transit time and attenuation.

Since the measuring signals emitted or received by the third and fourth ultrasonic transducers 9 and 10 have each passed through the fluid perpendicular to the flow direction A, their respective transit times through the fluid and their respective attenuations by the fluid are independent of the flow velocity at which the fluid flows through the measuring tube 2. Therefore, the sound propagation properties in the fluid can be determined from these measuring signals, independent of the flow velocity of the fluid.

Thus, at least one parameter of the fluid can be determined from the measuring signals emitted perpendicular to the flow direction A, which is dependent on the speed of sound or sound attenuation in the fluid. Such parameters are, for example, the viscosity of the fluid, the occurrence of air or gas bubbles, the concentration of components in the fluid, for example the methanol concentration, or the solids content in a suspension, or the cell density in a biological fluid.

In particular, these measuring signals passing through the fluid perpendicular to its flow direction A can also be used to detect changes in the fluid, in particular changes in its composition, for example the increase or decrease in the concentration or density of a component. As a consequence, this ultrasonic measuring device 1 is particularly suitable for process monitoring, for example in pharmaceutical or biological processes or for the control of such processes. Thus, for example, cell density, protein concentration, salt concentration, nutrient solution concentration, sugar concentration or methanol concentration can be monitored and controlled in one process. If a change in a parameter is detected by means of the ultrasonic measuring device 1, corrective measures can be initiated by an appropriately designed control loop in order to bring the parameter back to its set point.

Due to the fact that in particular the viscosity of the fluid flowing in the measuring tube can also be determined with the third and fourth ultrasonic transducers 9 and 10, it is possible to detect, determine or even compensate for changes in the viscosity of the fluid during a flow measurement.

It is understood that the measures described in connection with the different embodiments can of course be combined with each other and are not limited to the respective specific embodiment. In the following explanations are given which refer to the ultrasonic measuring device 1 according to the invention in general, i.e. in particular also to all embodiments and their variants.

The measuring tube 2 and the chambers 3 and 4 are those components of the ultrasonic measuring device 1 that come into contact with the fluid in the operation state. Therefore, the materials from which the measuring tube 2 and the two chambers 3 and 4 are made are selected according to the application. Preferably, the measuring tube 2 and the chambers 3, 4 are made of a plastic.

An essential criterion for the selection of a suitable material is, for example, whether the fluid is a high-purity fluid whose contamination should be prevented. Another criterion is whether the fluid is a biological fluid which should only come into contact with biocompatible materials. Furthermore, it is a criterion whether specific requirements should be made on the resistance of the measuring tube 2 and the chambers 3, 4 towards the fluid. If, for example, chemically aggressive fluids, e.g. acids, are passed through the measuring tube 2, a material should be selected for the measuring tube 2 and the chambers 3, 4 that has good resistance to aggressive fluids. Such aggressive fluids, for example, are fluids, that contain acids or highly abrasive suspensions known as slurries. Such fluids are used, for example, in the semiconductor industry.

In particular for applications with biological fluids or high-purity fluids or biotechnological fluids or for sterile applications, the measuring tube 2 and the chambers 3, 4 can, for example, be made of a plastic that meets the FDA (Federal Drug Administration) guidelines concerning this matter, e.g. polypropylene (PP), polyethylene (PE), polytetrafluoroethylene (PTFE), perfluoroalkoxy (PFA), ethylene tetrafluoroethylene copolymer (ETFE), ethylene chlorotrifluoroethylene (ECTFE), polycarbonate (PC), fluoroethylene propylene (FEP), polychlorotrifluoroethylene (PCTFE), glycol-modified polyethylene terephthalate (PETG), polyether ether ketone (PEEK). These plastics can of course also be used in other applications for the measuring tube 2 and the chambers 3, 4.

For many applications it is also preferred that the ultrasonic measuring device 1 or at least the components coming into contact with the fluid, namely the measuring tube 2 and the two chambers 3, 4, are designed as single-use parts for single use.

The design as a single-use part or with single-use parts is particularly suitable for such applications where a very high degree of purity or sterility of those components that come into contact with the fluid is essential. An important aspect with respect to single-use parts is that these single-use parts can be produced as economically and cost-effectively as possible. In this case, emphasis is particularly placed on inexpensive, simple starting materials, such as commercially available plastics. An environmentally conscious handling and a responsible use of the available resources are also substantial aspects in the design of single-use parts.

The term "single-use" in compositions such as "single-use part", single-use component etc. refer to those components or parts which are designed for single use, i.e. which can only be used once as intended and are then disposed of. For a new application, a new, previously unused single-use part must then be used. When configuring or designing the single-use parts, essential aspects are therefore that the single-use parts, e.g. the measuring tube 2, the first chamber 3 and the second chamber 4, can be manufactured as simply and economically as possible, generate few costs and can be produced from materials that are available at the lowest possible price. It is another aspect that the single-use parts can be joined together as easily as possible with other components that are designed for multiple use, i.e. are reusable. The single-use parts should therefore be able to be replaced very easily without the need for high assembly effort. It is also an important aspect that the single-use parts can be disposed of as easily as possible after use. For this reason, preference is given to materials for the single-use parts that cause the least possible environmental impact, in particular during disposal.

Another aspect is that the single-use parts should be sterilizable for certain applications. In this case, it is particularly advantageous if the single-use parts 2, 3, 4 are gamma-sterilizable. In this type of sterilization, the element to be sterilized is applied with gamma radiation. The advantage of gamma sterilization, for example in comparison to steam sterilization, is in particular that sterilization can also take place through the packaging. Particularly in the case of single-use parts, it is common practice that the parts are placed in the packaging after production and then stored for some time before being delivered to the customer. In such cases, sterilization takes place through the packaging, which is not possible with steam sterilization or other methods.

On the other hand, because they can only be used once, the single-use parts have the great advantage that the design does not have to place any emphasis on good cleanability of the single-use parts, because the single-use parts do not need to be cleaned when used as intended. Furthermore, it is usually not necessary that the single-use parts 2, 3, 4 they have to be sterilizable more than once. This is particularly advantageous for gamma sterilization, because the application of gamma radiation can lead to degradation of plastics, so that multiple gamma sterilization can make the plastic unusable.

Since a sterilization at high temperatures and/or under high (steam) pressure is usually not necessary for single-use parts, more cost-effective plastics can be used, for example those which cannot withstand high temperatures, or which cannot be subjected to high temperature and pressure several times.

Taking all these aspects into account, it is therefore preferred to use such plastics that can be gamma-sterilized at least once, in particular for the production of disposable parts. The materials should be gamma-stable for a dose of at least 40 kGy to allow a single gamma sterilization. In addition, no toxic substances should be produced during gamma sterilization.

In addition, it is preferred that all materials that come into contact with the substances to be mixed or the mixed substances meet USP Class VI standards.

For the production of the single-use parts 2, 3, 4, which come into contact with the fluid, the following plastics are preferred: polyethylene (PE), low-density polyethylene (LDPE), ultra-low-density polyethylene (ULDPE), ethylene-vinyl acetate (EVA), polyethylene terephthalate (PET), polyvinyl chloride (PVC), polypropylene (PP), polyurethane (PU), silicones, polyvinylidene fluoride (PVDF), acrylonitrile butadiene styrene (ABS), polyacrylic, polycarbonate (PC), polyether ether ketone (PEEK).

For applications in which the single-use parts 2, 3, 4 should be gamma-sterilizable, for example, the materials known under the brand name Teflon, polytetrafluoroethylene (PTFE) and perfluoroalkoxy polymers (PFA), are less suitable or even unsuitable. Gamma sterilization of these materials involves the risk of hazardous gases such as fluorine escaping, which can then form toxic or harmful compounds such as hydrofluoric acid (HF).

It is also preferred if the components made of plastic can be produced by means of an injection molding process, because this is a particularly cost-effective way of manufacturing.

Furthermore, a method for manufacturing an ultrasonic measuring device 1 according to the invention is proposed by the invention, which is characterized in that the measuring tube 2, the first chamber 3 and the second chamber 4 are made of a plastic.

On the basis of FIGS. 10 to 14, different preferred variants of the method according to the invention are explained, whereby primary reference is made to the manufacture of the fifth embodiment of the ultrasonic measuring device 1 according to the invention. Of course, these methods or variants are suitable in an analogously same manner for the manufacture of the other embodiments.

Preferably, the measuring tube 2, the first chamber 3 and the second chamber 4 are manufactured in an injection molding process. For this purpose, the plastic from which the measuring tube 2 and the two chambers 3, 4 are formed is preferably a thermoplastic.

According to the embodiment represented in FIG. 10, the measuring tube 2, the first chamber 3 and the second chamber 4 are manufactured in one piece. For this purpose, a blow molding process is suitable, for example, which is a special injection molding process. In this process, a molding is first produced by conventional injection molding. This is then heated, introduced into the tool and blown into the final shape given by the tool by the application of gas or air.

In the variants represented in FIGS. 11 to 14, the unit comprising measuring tube 2, first chamber 3 and second chamber 4 is joined together from several individual parts, preferably injection molded in each case. The individual parts are each manufactured by injection molding and then joined together, preferably by a welding process.

In FIGS. 11 to 14, the measuring tube 2, the first chamber 3 and the second chamber 4 are each shown in an exploded view, each showing the separate individual parts which are manufactured by injection molding and then joined together to form the unit comprising measuring tube 2, first chamber 3 and second chamber 4.

Figure 11:
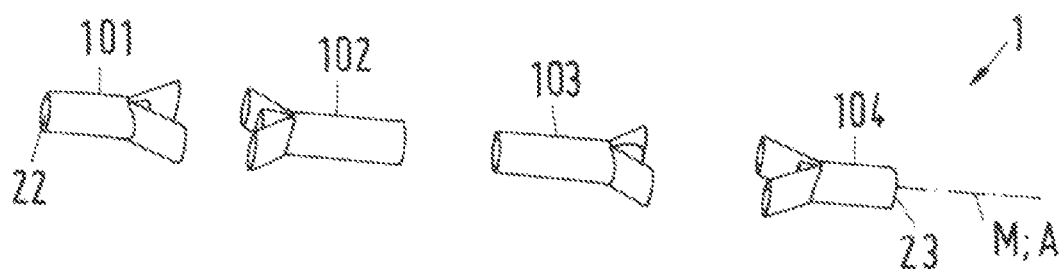
FIGS. 11-14 are different variants for the parts from which an ultrasonic measuring device according to the invention can be manufactured.

In the variant shown in FIG. 11, four individual parts 101, 102, 103 and 104 are provided, each of which is Y-shaped. The first individual part 101 extends from the inlet 22 to a first section, which is made perpendicular to the central axis M and through the middle of the first chamber 3. The second individual part 102 extends from this first section to a second section, which is made perpendicular to the central axis M and midway between the first chamber and the second chamber. The third individual part extends from this second section to a third section, which is made perpendicular to the central axis M and through the center of the second chamber 4. The fourth individual part 104 extends from this third section to the outlet 23 of the measuring tube 2. Preferably, the first individual part 101 and the fourth individual part 104 are identically designed, and the second individual part 102 and the third individual part 103 are also identically designed. Due to this fact, only two different tools are required for injection molding the individual parts 101, 102,

103 and 104. Three joining processes, preferably welding processes, are then required to join the four individual parts 101 to 104 together.

In the variant represented in FIG. 12, four individual parts 201, 202, 203, 204 are provided, namely an inlet part 201, which comprises the inlet 22, an outlet part 204, which comprises the outlet 23, a lower part 202, which is arranged between the inlet part 201 and the outlet part 204 and is open at the top according to the representation, and a cover 203, which covers the lower part 202. The inlet part 201 extends from the inlet 22 to a first section, which is made perpendicular to the central axis M and between the inlet 22 and the first chamber 3. The outlet part 204 extends from a second section, which is made perpendicular to the central axis M and between the second chamber 4 and the outlet 23. The lower part 202 and the cover 203 each extend from the first section to the second section, wherein the lower part 202 and the cover 203 are separated from each other by a section parallel to the central axis M.

In this variant, the inlet part 201 and the outlet part are preferably designed identically. Due to this fact, only three different tools are required for injection molding the individual parts 201, 202, 203 and 204. Three joining processes, preferably welding processes, are then required to join the four individual parts 201 to 204 together.

In the variant represented in FIG. 13, two individual parts 301, 302 are provided, namely a lower part 301 and a cover part 302. The lower part 301 is separated from the cover part 302 by a section, which is made parallel to the central axis M in an area comprising the first chamber 3, the second chamber 4 and the intermediate section of the measuring tube 2. On the inlet side of the first chamber 3 and on the outlet side of the second chamber 4, the section extends obliquely to the central axis M, downwards according, to the representation, so that the inlet 22 and the outlet 23 each belong completely to the cover part 302.

Due to this fact, only two different tools are required for injection molding the individual parts 301 and 302. Only one joining process, preferably a welding process, is then required to join the two individual parts 301 and 302 together.

In the variant represented in FIG. 14, only two individual parts 401, 402 are also provided, namely a lower part 401 and a cover part 402. The lower part 401 is separated from the cover part 402 by a section, which is substantially parallel to the central axis M, wherein the section ends on the one hand between the inlet 22 and the first chamber 3 and on the other hand between the second chamber 4 and the outlet 23, so that the lower part 401 is longer than the cover part 402 with respect to the direction defined by the central axis M. Thus, the inlet 22 and the outlet 23 each belong completely to the lower part 401.

Only two different tools are required for this variant for injection molding the individual parts 401 and 402. Only one joining process, preferably a welding process, is then required to join the two individual parts 401 and 402 together.

Furthermore, an ultrasonic measuring system for the measurement on a flowing fluid is proposed by the invention. FIG. 15 shows in a schematic representation a first embodiment of an ultrasonic measuring system according to the invention, which is referred to as a whole with the reference sign 500.

The ultrasonic measuring system 500 according to the invention can comprise in particular an ultrasonic measuring device 1 according to the invention. The preceding explanations relating to the embodiments of the ultrasonic measuring device 1 according to the invention and all of its variants also apply in the same way or in the analogously same way to the ultrasonic measuring system 500 according to the invention. In the embodiment of the ultrasonic measuring system 500 according to the invention, the same parts or functionally equivalent parts are designated with the same reference signs as in the previously described embodiments of the ultrasonic measuring device 1.

The ultrasonic measuring system 500 according to the invention comprises a single-use device 510 designed for single use, a reusable device 520 designed for multiple use and the first ultrasonic transducer 5 and the second ultrasonic transducer 6. In the first embodiment, the two ultrasonic transducers 5, 6 are part of the single-use device 510, i.e. the two ultrasonic transducers 5, 6 are designed for single-use.

The single-use device 510 comprises all those components that are designed as single-use parts in the sense described above. These are in particular the measuring tube 2, the first chamber 3, in which the first ultrasonic transducer 5 is arranged, and the second chamber 4, in which the second ultrasonic transducer 6 is arranged. The measuring tube 2 has the central axis M, which defines the flow direction A for the fluid. The measuring tube 2 further has the inlet 22 and the outlet 23 for the fluid. The fluid is symbolically represented in FIG. 15 by the two arrows F. The faces of the surfaces facing each other of the first chamber 3 and the second chamber 4 bound the rectilinear measuring section 7 for the fluid, which extends from the first chamber 3 to the second chamber 4. The first chamber 3 and the second chamber 4 are designed and arranged such that the fluid can flow around each of them, and that the measuring section 7 extends in the flow direction A.

The reusable device 520 comprises the control device 540 which is designed to actuate the ultrasonic transducers 5, 6 and to receive signals from the ultrasonic transducers 5, 6, and which also comprises the evaluation unit for evaluating and analyzing the signals received from the ultrasonic transducers 5, 6.

The reusable device 520 is detachably connectable to the single-use device in such a way that the reusable device 520 and the single-use device 510 are fixed relative to each other. The connection of the single-use device 510 with the reusable device 520 is designed such that it can be released and closed by hand and without the use of tools.

In the first embodiment of the ultrasonic measuring system 500, at least one mechanical clamp 531 is provided, which is part of the reusable device 520 and which can overlap the single-use device 510 in the form of a snap connection so that the single-use device 510 can be clamped to the reusable device 520. Of course, several mechanical clamps 531 can also be provided.

To connect the single-use device 510 to the reusable device 520, a projection 532 is also provided on the reusable device which, when assembling with the single-use device 510, engages in a recess 533 provided in the single-use device. The projection 532 and the recess 533 are preferably designed for a form-locking cooperation, so that the single-use device 510 can be easily placed on or removed from the reusable device 520.

For a better understanding, the schematic representation in FIG. 15 still shows the single-use device 510 somewhat separated from the reusable device 520. It is understood that, in the assembled state, the projection 532 engages in the recess 533 and the single-use device 510 preferably rests on the reusable device 520.

The control device 540 comprises a supply and communication unit 541, which can be supplied with energy via a signal connection 542 for supplying the ultrasonic measuring system 500. Furthermore, the supply and communication unit 541 serves as interface for communication and for data exchange with a user. The supply and communication unit 541 is signal-connected to a central processing unit 544, as indicated by the arrow 543. In the central processing unit 544, the signals for actuating the ultrasonic transducers 5, 6 are generated. The central processing unit 544 further comprises the evaluation unit for evaluating and analyzing the signals received from the ultrasonic transducers 5, 6.

The central processing unit 544 is signal-connected to an analog unit 545 as indicated by the arrow 546. The analog unit 545 is connected via a first signal connection U1 to the first ultrasonic transducer 5 and via a second signal connection U2 to the second ultrasonic transducer U2. The ultrasonic transducers 5, 6 are actuated via the signal connections U1 and U2, and the measuring signals received from the ultrasonic transducers 5, 6 are fed into the control unit 540.

Furthermore, a memory interface 547 is provided in the control device 540, which is signal-connected to the central processing unit 540 as indicated by the arrow 548. The memory interface 547 can also communicate via a third signal connection U3 with a memory unit 511, which is provided in the single-use device 510. In particular, specific calibration data or configuration parameters are stored in the memory unit 511, which are specific to the respective single-use device 510. As soon as the single-use device 510 is connected to the reusable device 520, the memory interface 547 of the control device 540 can read out these specific calibration data from the memory unit 511 of the respective single-use device 510 and transmit them to the central processing unit 544.

Additional information can be stored in the memory interface 547, in particular also information which is specific to a certain single-use device 510, for example the service life of the single-use device 510 or a temperature curve over time.

The temperature sensor 8 is also provided in the control device 540 to determine the temperature of the fluid. The temperature sensor 8 is disposed in the projection 532 so that after the assembly of the single-use device 510 and the reusable device 520, the temperature sensor 8 is placed as close as possible to the measuring channel 7 through which the fluid flows. The temperature sensor 8 is signal-connected to the central processing unit 544, as indicated by the arrow with the reference sign 81.

Due to this embodiment, the measuring tube 2, which is designed as a single-use part, with the ultrasonic transducers 5, 6 arranged in it can be fixed to the reusable device 520 in a very simple way and in particular without tools. No further measurements are necessary, because all required calibration data or configuration data are automatically fed into the central processing unit 544, so that the ultrasonic measuring system 500 can be put into operation immediately. It is also particularly advantageous that the cost-intensive components, such as the required electronic components, are integrated in the reusable device 520.

FIG. 16 shows in a perspective representation a first variant of the first embodiment of the ultrasonic measuring system 500, wherein the single-use device 510 is not yet inserted into the reusable device 520. FIG. 17 shows the same variant from a different perspective, wherein the single-use device 510 is inserted into the reusable device 520.

In this variant, two mechanical clamps 531 are provided, one of which can grip the inlet 22 of the measuring tube 2 in the form of a snap connection, and the other the outlet 23 of the measuring tube 2. To connect the single-use device 510 to the reusable device 520, the single-use device 510 is inserted into the reusable device 520 and pressed on, so that the inlet 22 and the outlet 23 snap into the two mechanical clamps 531. A release mechanism 535 is also provided on each mechanical clamp 531. By pressing the respective release mechanism 535, the mechanical clamps 531 release the single-use device 510.

A directional arrow R is also provided on the reusable device 520, indicating the flow direction A of the fluid. Such a directional arrow is also on the single-use device 510.

Optionally, keys 518 can be provided on the single-use device 510, for which the reusable device 520 has grooves 528 which receive the keys 518. In this way, it can be ensured that the single-use device 510 can only be inserted in the reusable device 520 in exactly one orientation.

FIG. 18 shows in a perspective representation a second variant of the first embodiment of the ultrasonic measuring system 500, wherein the single-use device 510 is not yet inserted into the reusable device 520.

In this second variant, the reusable device 520 comprises a housing 600, which is designed as a lockable housing 600. The housing 600 comprises a first housing part 610 and a second housing part 620, which are connected to each other by an articulated joint 630. FIG. 18 shows the housing 600 in the open state. The control device 540 is arranged in the first housing part 610. The second housing part 620 serves as a cover with which the housing 600 can be closed. The housing 600 further has a continuous central recess 640, which extends through the entire housing 600 and serves to receive the single-use device 510.

The housing 600 further has a locking mechanism 650 to close the housing 600 and thus to fix the single-use device 510 inserted in the recess 640 with respect to the reusable device 520. The locking mechanism 650 is arranged here on the first housing part 610 and comprises a strap 651 which is designed for the cooperation with a recess 621 in the second housing part 620.

The single-use device 510 is inserted into the central recess 640 so that the projection 532 engages in the recess 533. Subsequently, the two housing parts 610, 620 are folded together, i.e. the second housing part 620 is folded over the single-use device 510 so that the strap 651 engages in the recess 621 and overlaps the second housing part 620. In this way, the housing 600 is closed and the single-use device 510 is fixed with respect to the reusable device 520.

FIG. 19 shows a preferred embodiment of the single-use device 510 in a perspective exploded view. For a better understanding, FIG. 20 still shows this embodiment in the assembled state and in a sectional view, where the section is made along the flow direction A.

In this embodiment, the single-use device 510 comprises, apart from the ultrasonic transducers 5, 6, three parts, namely a main part 700, a cover 710, and a base 720.

The main part 710 comprises the inlet 22, the outlet 23, the two chambers 3, 4 and the channel which forms the measuring section 7 between the two chambers 3, 4. The cover 710 closes the single-use device 510 on the side facing away from the reusable device 520 when the single-use device 510 is inserted into the reusable device 520. Thus, the cover 710 comes into contact with the fluid during operation, because the cover 710 closes the measuring section 7 at the top according to the representation. According to the representation, the channel forming the measuring section 7 is delimited downwards by a base plate 701 (FIG. 20), which is an integral part of the main part 700. According to the representation below the base plate 701, the base 720 is provided, which closes the single-use device 510. When the single-use device 510 is inserted into the reusable device 520, the base 720 rests on the reusable device 520. A cavity 70 is disposed between the underside of the main part 700, i.e. the base plate 701, and the base 720, which cavity connects the first chamber 3 with the second chamber 4.

Similar to the embodiment represented in FIG. 14, the main part 700 and the cover 710 are separated by a section which is substantially parallel to the central axis M, wherein the section ends on the one hand between the inlet 22 and the first chamber 3 and on the other hand between the second chamber 4 and the outlet 23, so that the main part 700 is longer than the cover 710 with respect to the direction defined by the central axis M. Thus, the inlet 22 and the outlet 23 each belong completely to the main part 700. The cover 710 is designed to be beveled in the area of both ends. The main part 700 comprises in each case complementary bevels.

Furthermore, several grooves 702 are disposed in the main part. 700, each extending in the flow direction A and arranged laterally to the channel forming the measuring section 7, which increase the mechanical stability of the measuring section 7.

The main part 700, the cover 710 and the base 720 are each manufactured separately, preferably by an injection molding process and then joined together in a joining process. In particular, the joining of the main part 700 with the cover 710 requires special care because this connection must be designed to be fluid-tight and in particular liquid-tight. Welding methods such as laser welding or adhesive bonding are particularly suitable as a method for joining the main part 700, the cover 710 and the base 720. Methods such as screwing are also possible.

A particular advantage of the embodiment described here is that the one-piece main part 700 comprises the entire dimensions from the inlet 22 to the outlet 23, i.e. in particular also the chambers 3, 4 and the channel forming the measuring section 7. This increases the mechanical stability of the entire single-use device 510 and prevents misalignments.

Electrical contacts 721 are provided in the base 720, which belong to the signal connections U1, U2 and U3, via which the single-use device 510 and the reusable device 520 exchange signals, and via which energy can be supplied to the single-use device 510. Furthermore, an opening 722 is disposed in the base 720, which is part of the recess 533.

According to another embodiment, the first chamber 3 and/or the second chamber 4 are each provided in a separate chamber insert 30. Such embodiments are shown in FIG. 21-FIG. 23.

FIG. 21 shows a plan view on the chamber insert 30, which can be provided for both the first chamber 3 and the second chamber 4. For a better understanding, FIG. 22 shows a sectional view of the chamber insert 30 in a section along the flow direction A.

The separate chamber insert 30 is inserted into an opening disposed for this purpose and then joined together with the single-use device 510, preferably by a welding process, in particular by laser welding. The welding seams S are indicated in FIG. 21 to FIG. 23 by dashed lines or by points S. As shown in particular in FIG. 22, positioning elements 40 can be provided, for example grooves and pins engaging in them, so that the respective ultrasonic transducer 5 or 6 is correctly aligned in the flow direction A.

FIG. 23 shows, in a representation analogous to FIG. 22, a variant for the chamber insert 30, for whose fastening fewer welding seams S are required.

FIG. 24 shows a possible embodiment for the signal connections U1, U2 or U3, which enable an electrical connection between the single-use device and the reusable device.

In that surface of the reusable device 520 which faces the single-use device 510 in the assembled state, one or more spring contacts 90 are provided, which each comprise a conductive head 91 protruding from the reusable device 520, which is spring-loaded by a spring element 92. Each of the spring contacts is signal-connected to the analog unit 545 via the signal connections U1 or U2. Preferably, the head 91 is made of gold.

The electrical contacts 721 are provided in the base 720 of the single-use device 510, which are arranged in such a way that, in the assembled state of the single-use device 510 and the reusable device 520, they press on the spring contacts 90 and thus form an electrical connection between the single-use device 510 and the reusable device 520.

The electrical contacts 721 are each protected against the leakage of fluid from the single-use device 510 by a sealing element 722, for example an O-ring. The spring contacts 90 are each protected against the penetration of the fluid into the reusable device 520 by a sealing element 93, for example an O-ring.

For each ultrasonic transducer 5, 6—only the first ultrasonic transducer 5 is represented in FIG. 24—two electrical contacts 721 are each provided which are connected to the respective ultrasonic transducer 5 or 6 via the signal connection U1 or U2. This can be realized by wires, for example.

Of course, a common reference conductor can also be provided for the two ultrasonic transducers 5 and 6, so that a total of three electrical lines are required, namely the common ground reference conductor and one line for each ultrasonic transducer 5 or 6.

The signal connection U3 between the memory unit 511 in the single-use device 510 and the memory interface can also be designed in the analogously same way.

FIG. 25 shows, in a representation analogous to FIG. 24, a further possible embodiment for the signal connections U1, U2, which enable an electrical connection between the single-use device 510 and the reusable device 520. In this embodiment, instead of the electrical contacts 721, a PCB (Printed Circuit Board) 725 is provided in the single-use device, which is preferably designed as a flexible PCB and arranged in the cavity 70. Of course, several PCBs can be provided in other embodiments. For example, the PCB 725 can be fixed in the cavity 70 in a watertight manner by means of gluing or by means of press-fit technology so that the fluid cannot escape from the single-use device.

The PCB 725 has a contact surface 726 arranged over an opening 727 so that the spring contact 90 can contact the contact surface 726. In particular, if the PCB 725 is designed as a flexible PCB, the PCB 725 can be directly connected to the ultrasonic transducers 5, 6 via a solder connection.

FIG. 26 shows, in a representation analogous to FIG. 24, a further possible embodiment for the signal connections U1, U2, which enable an electrical connection between the single-use device 510 and the reusable device 520. In this embodiment, no direct electrical contact is provided between the single-use device 510 and the reusable device 520, but an inductive coupling. For this purpose, a split electrical transformer 95 is provided, one side 951 of which is arranged in the reusable device and the other side 952 of which is arranged in the single-use device 510.

In those embodiments where the PCB 725 is provided in the single-use device 510, the memory unit 511 can be integrated in the PCB 725, for example as a solid state memory or microcontroller. In addition to the calibration data or configuration parameters of the single-use device 510, other parameters such as the operating time or other information, in particular information specific to the respective single-use device 510, can also be stored there. Furthermore, simple, or intelligent error detection and correction means can also be integrated in the memory unit 511.

Figure 28:
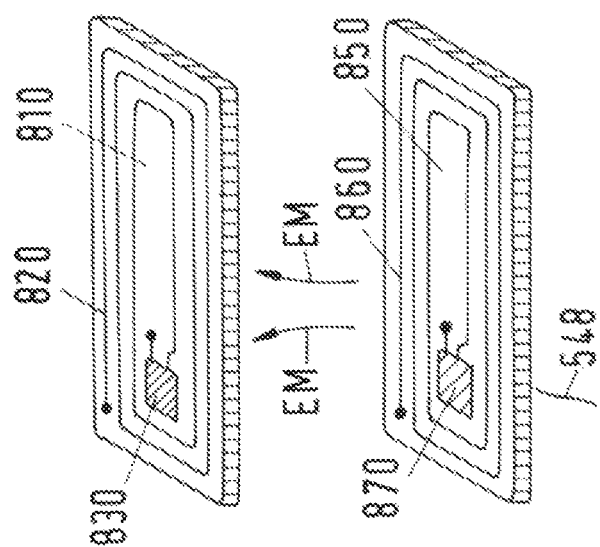
FIG. 28 is the two components for the communication from FIG. 27.
Figure 27:
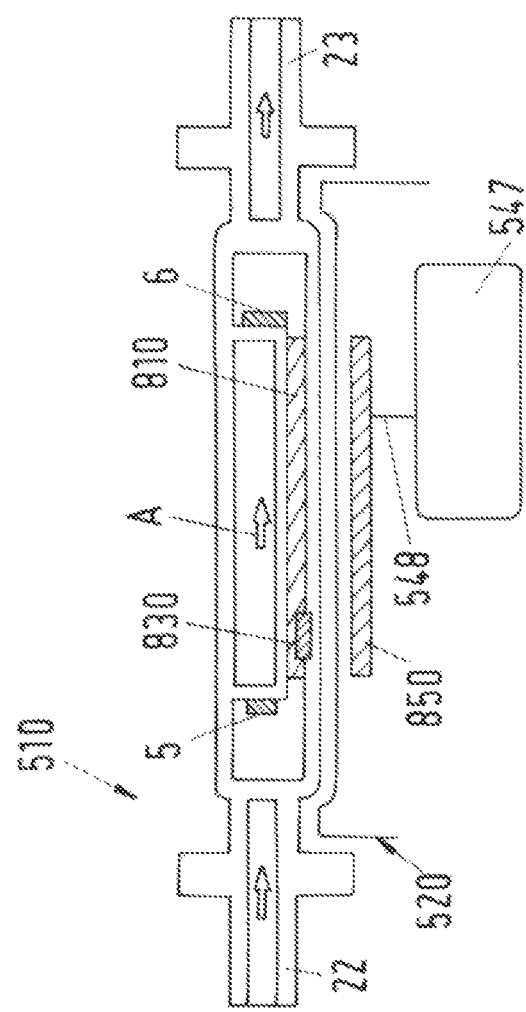
FIG. 27 is an embodiment for the communication between the storage unit of the single-use device and the storage interface of the reusable device.

The communication between the memory unit 511 of the single-use device 510 and the memory interface 547 of the reusable device 520 can also take place by means of RFID technology (RFID: Radio Frequency Identification). Such an embodiment is shown in FIG. 27. For a better understanding, FIG. 28 still shows the two components for radio frequency identification.

A first antenna carrier 810 is provided in the single-use device 510, which carries a first antenna 820, which is connected to a passive transponder 830 arranged on the first antenna carrier 810.

A second antenna carrier 850 is provided in the reusable device 520, which carries a second antenna 860 which is connected to an active transceiver 870 arranged on the second antenna carrier 850. The active transceiver 870 is signal-connected to the memory interface 547.

The passive transponder 830 and the active transceiver 870 communicate with each other in a manner known per se via electromagnetic fields EM.

The passive transponder 830 and the active transponder 870 are each arranged in such a way that they are as close as possible to each other in the assembled state of the single-use device 510 and the reusable device 520. By using a suitable EM field strength and shape of the antennas 820, 860, it can be achieved that only the directly adjacent passive transponder 830 is read and no others in the immediate vicinity.

Another possibility to transfer configuration parameters and/or calibration data of a specific single-use device 510 to the memory interface 547 of the reusable device 520 is represented in FIG. 29 and in FIG. 30. In this embodiment, the single-use device 510 is provided with a tag 900, which contains the specific information 910, i.e. for example the calibration data, for this single-use device 510. For example, the tag 900 is designed as a two-dimensional "bar code", e.g. as a QR code. The tag 900 is applied to the single-use device 510, visible from the outside, on that side of the single-use device 510 which faces the reusable device 520 in the assembled state.

A camera 920 is provided in the reusable device 520, which can record the tag 900. This means that the tag 900 is arranged on the single-use device 510 in such a way that it is in the line of sight of the camera 920 when the single-use device 510 and the reusable device 520 are in the assembled state.

The camera 900 is signal-connected to the memory interface 547. Optionally, a lens 930 and/or at least one light source 940 can be provided in the reusable device 520 to ensure a reliable optical detection of the tag 900 by the camera 920 under all conditions. The light source 940 can be designed as LED in particular.

It is understood that in addition to the temperature sensor, other sensors can also be provided in the reusable device, for example sensors with which gas bubbles or particles in the fluid can be detected, or sensors with which changes in the fluid can be detected, for example color changes or changes of the pH-value. These sensors can be, for example, optical sensors or electromagnetic or capacitive or magnetic sensors.

A further advantageous measure for the embodiment of the single-use device 510 is represented in FIG. 31. Several recesses 20 are disposed in the wall of the measuring tube 2 along the measuring section 7, which capture reflections of the ultrasonic signals so that these reflections cannot return to the measuring section 7 or these reflections are at least strongly attenuated. The recesses 20 are preferably arranged in such a way that they form a structure which is symmetrical with respect to a central plane E which is perpendicular to the flow direction A and is located in the middle between the first ultrasonic transducer 5 and the second ultrasonic transducer 6.

Yet a further advantageous measure for the design of the single-use device 510 is represented in FIG. 32. In this embodiment, a buffer zone 311 or 411 is provided in each case between the first ultrasonic transducer 5 and the first wall 31 of the first chamber 3 and between the second ultrasonic transducer 6 and the second wall 41 of the second chamber 4 in order to fade out the near field of the generated ultrasonic signals or to prevent the near field from penetrating into the measuring section 7. In the near field directly in front of the ultrasonic transducers 5 or 6, chaotic wave conditions prevail which lead to high signal losses if the near field penetrates the measuring section 7. By the buffer zones 311 and 411 it can be achieved that substantially only the far field is introduced into the measuring section 7. Preferably, each buffer zone 311 or 411 has a length in the flow direction A which is at least four times as long as the extension of the respective ultrasonic transducer 5 or 6 in the flow direction A.

As an alternative to the buffer zones 311 or 411, it is also possible to use special ceramics for the ultrasonic transducers 5 or 6, which generate only a negligible near field. Such special ceramics comprise, for example, a large number of very small vibrating whiskers, which are arranged in a two-dimensional matrix.

FIG. 33 shows in a perspective view a second embodiment of an ultrasonic measuring system 500 according to the invention. In the following description of the second embodiment, only the differences to the first embodiment will be explained in detail. Otherwise, the explanations with respect to the first embodiment also apply to the second embodiment in the same way or in the analogously same way. In the second embodiment, the same parts or parts with the same function are designated with the same reference signs as in the first embodiment.

The main difference to the first embodiment is that in the second embodiment the first ultrasonic transducer 5 and the second ultrasonic transducer 6 are part of the reusable device 520, and the single-use device 510 does not comprise any ultrasonic transducers, which makes the manufacture of the single-use device 510 more cost-effective.

FIG. 34 shows a perspective sectional view of the single-use device 510 of the second embodiment. For a better understanding, FIG. 35 still shows an enlarged view of a detail of FIG. 34. FIG. 36 shows a schematic view to explain the coupling of the ultrasonic signal into the measuring section 7.

In the second embodiment, the first ultrasonic transducer 5 and the second ultrasonic transducer 6 are arranged in the control device 540 in such a way that, in the assembled state of the single-use device 510 and the reusable device 520, they are arranged below the first chamber 3 and below the second chamber 4 according to the representation.

In the following explanation, only the first ultrasonic transducer 5 and the first chamber 3 are referred to. It is understood that these explanations also apply analogously to the second ultrasonic transducer 6 and the second chamber 4.

A waveguide element 39 is provided in the first chamber 3, which comprises a coupling surface 391 whose surface normal vector is perpendicular to the flow direction A and which faces the first ultrasonic transducer 5. The waveguide element 39 further has a decoupling surface 392 whose surface normal vector is in the flow direction A and which is formed by the first wall 31 of the first chamber 3. The waveguide element 39 further has a deflecting surface 393 whose surface normal vector is inclined at 45° to the flow direction A in such a way that the ultrasonic signals arriving through the coupling surface 391 are deflected or reflected in the flow direction A. The deflecting surface 393 can be coated with a reflection-enhancing material 394 (FIG. 36) or consist of a reflection-enhancing material 394. In FIG. 36, the ultrasonic signals are indicated by the arrows with the reference sign US.

What is claimed:

1. An ultrasonic measuring system for the measurement of a flow of a fluid, comprising:
   a single-use device designed for single use;
   a reusable device designed for multiple use;
   a first ultrasonic transducer; and
   a second ultrasonic transducer,
   the single-use device comprising a measuring tube, a first chamber and a second chamber, the measuring tube having a central axis defining a flow direction for the fluid, the first chamber configured to emit a signal of the first ultrasonic transducer, the second chamber configured to emit a signal of the second ultrasonic transducer, the measuring tube further including an inlet and an outlet for the fluid, the first chamber and the second chamber bound a rectilinear measuring section for the fluid which extends from the first chamber to the second chamber, the first chamber and the second chamber being configured and arranged such that the fluid is capable of flowing around each of the first chamber and the second chamber, and that the measuring section extends in the flow direction,
   the reusable device comprising a control device configured to actuate the ultrasonic transducers and to receive signals from the ultrasonic transducers,
   and the reusable device is detachably connectable to the single-use device so that the reusable device and the single-use device are fixed relative to each other.

2. The ultrasonic measuring system according to claim 1, wherein the single-use device and the reusable device are connectable to each other by a clamping connection.

3. The ultrasonic measuring system according to claim 1, wherein the first ultrasonic transducer and the second ultrasonic transducer are part of the single-use device or of the reusable device.

4. The ultrasonic measuring system according to claim 1, wherein both the first and second chambers are free of fluid during operation.

5. The ultrasonic measuring system according to claim 1, wherein both the first and second chambers are separate from each other.

6. An ultrasonic measuring system according to claim 1, wherein, the single-use device is an ultrasonic measuring device.

7. The ultrasonic measuring device according to claim 6, wherein the first chamber and the second chamber are arranged in the measuring tube between the inlet and the outlet.

8. The ultrasonic measuring device according to claim 6, wherein the first ultrasonic transducer and the second ultrasonic transducer are arranged on the central axis of the measuring tube.

9. The ultrasonic measuring device according to claim 6, wherein the measuring tube has a flow cross-section for the fluid between the first ultrasonic transducer and the second ultrasonic transducer, the flow cross-section between the first ultrasonic transducer and the second ultrasonic transducer being smaller than a flow cross-section at the inlet of the measuring tube.

10. The ultrasonic measuring device according to claim 6, wherein the measuring tube has a substantially constant flow cross-section for the fluid between the first ultrasonic transducer and the second ultrasonic transducer.

11. The ultrasonic measuring device according to claim 6, wherein the first chamber is arranged closer to the inlet and the second chamber is arranged closer to the outlet, the first chamber has a first flow guiding element on a side facing the inlet to reduce turbulence, or the second chamber has a second flow guiding element on a side facing the outlet to reduce turbulence.

12. The ultrasonic measuring device according to claim 6, wherein the measuring section has a first end at the first ultrasonic transducer and a second end at the second ultrasonic transducer, and an acoustic lens configured to focus ultrasonic signals is provided at each of the first end and the second end.

13. The ultrasonic measuring device according to claim 6, wherein each of the first chamber and the second chamber has a substantially drop-shaped profile in the flow direction.

14. The ultrasonic measuring device according to claim 6, further comprising a temperature sensor configured to determine the temperature of the fluid.

15. The ultrasonic measuring device according to claim 6, wherein a third ultrasonic transducer and a fourth ultrasonic transducer are provided on the measuring tube, the third and the fourth ultrasonic transducer lie opposite each other and are each arranged and aligned perpendicular to the flow direction to emit an ultrasonic signal.

* * * * *